US009001691B2

(12) United States Patent
Murray et al.

(10) Patent No.: US 9,001,691 B2
(45) Date of Patent: Apr. 7, 2015

(54) MESSAGING SYSTEMS AND METHODS

(75) Inventors: Douglas G. Murray, Kirkland, WA (US); Steven J. Tindall, Kirkland, WA (US); Roger E. Visser, Bellevue, WA (US)

(73) Assignee: Applied Voice & Speech Technologies, Inc., Foothill Ranch, CA (US)

( * ) Notice: Subject to any disclaimer, the term of this patent is extended or adjusted under 35 U.S.C. 154(b) by 709 days.

(21) Appl. No.: 11/747,154

(22) Filed: May 10, 2007

(65) Prior Publication Data
US 2008/0037565 A1  Feb. 14, 2008

Related U.S. Application Data

(60) Provisional application No. 60/799,485, filed on May 10, 2006.

(51) Int. Cl.
| H04L 12/28 | (2006.01) |
| H04L 12/50 | (2006.01) |
| H04M 1/64 | (2006.01) |
| H04M 3/42 | (2006.01) |
| H04M 7/00 | (2006.01) |
| H04M 3/53 | (2006.01) |
| H04L 29/08 | (2006.01) |
| H04L 12/58 | (2006.01) |

(52) U.S. Cl.
CPC ......... *H04M 3/5307* (2013.01); *H04L 67/1095* (2013.01); *H04L 12/58* (2013.01); *H04M 2203/4509* (2013.01)

(58) Field of Classification Search
USPC .............. 370/412, 254, 386, 401; 379/88.22, 379/211.01, 229, 265.01
See application file for complete search history.

(56) References Cited

U.S. PATENT DOCUMENTS

| 5,740,231 | A | * | 4/1998 | Cohn et al. ................. 379/88.22 |
| 5,781,902 | A | * | 7/1998 | Waszkiewicz ........................ 1/1 |
| 5,822,578 | A | * | 10/1998 | Frank et al. .................... 712/244 |
| 6,031,895 | A | * | 2/2000 | Cohn et al. ................. 379/88.13 |
| 6,055,227 | A | * | 4/2000 | Lennert et al. ................. 370/254 |
| 6,459,785 | B1 | * | 10/2002 | Naumburger ............ 379/214.01 |
| 6,816,479 | B1 | * | 11/2004 | Euget et al. .................... 370/351 |
| 7,275,142 | B1 | * | 9/2007 | Schultz et al. ................. 711/162 |
| 7,454,443 | B2 | * | 11/2008 | Ram et al. ............................ 1/1 |
| 7,519,785 | B1 | * | 4/2009 | Schultz et al. ................. 711/162 |
| 7,620,658 | B2 | * | 11/2009 | Benson et al. ........................ 1/1 |
| 2004/0202302 | A1 | * | 10/2004 | Richards .................. 379/201.12 |
| 2005/0086241 | A1 | * | 4/2005 | Ram et al. ..................... 707/100 |

(Continued)

*Primary Examiner* — Alpus H Hsu
(74) *Attorney, Agent, or Firm* — Anatoly S. Weiser, Esq.; Acuity Law Group, P.C.

(57) ABSTRACT

Apparatus, methods, and machine-readable articles of manufacture improve reliability and scalability of a messaging system. In some embodiments, the system's configuration data and subscriber information are stored in a central repository of a core node, and replicated to one or more non-core nodes. Data replication may be performed in real-time or near real-time, periodically, sporadically, or otherwise. Nodes may rely on the replicated data to provide the system's subscribers and outside callers with services that do not involve updating of configuration or subscriber data. In this way, the non-core nodes may continue to process calls when the core node is unavailable. For example, the non-core nodes can route calls to the appropriate subscribers without relying on the core. As another example, die non-core nodes can take messages from callers when the core node is unavailable. The messages may be queued for posting and delivery when the core node becomes available.

55 Claims, 9 Drawing Sheets

(56) References Cited

U.S. PATENT DOCUMENTS

| | | | |
|---|---|---|---|
| 2006/0047776 A1* | 3/2006 | Chieng et al. | 709/217 |
| 2006/0195607 A1* | 8/2006 | Naseh et al. | 709/238 |
| 2007/0036331 A1* | 2/2007 | Fitzgerald | 379/265.02 |
| 2007/0168692 A1* | 7/2007 | Quintiliano | 714/4 |
| 2007/0174660 A1* | 7/2007 | Peddada | 714/4 |
| 2007/0234108 A1* | 10/2007 | Cox et al. | 714/6 |
| 2008/0005380 A1* | 1/2008 | Kawasaki et al. | 710/15 |

\* cited by examiner

MESSAGING SYSTEMS AND METHODS

CROSS-REFERENCE TO RELATED APPLICATION

This application claims priority benefit of provisional U.S. patent application Ser. No. 60/799,485, entitled SCALABLE UNIFIED COMMUNICATIONS SYSTEM, filed on May 10, 2006, which application is hereby incorporated by reference, including all figures, tables, and claims.

FIELD OF THE INVENTION

The present invention relates generally to telecommunication systems and methods, and, more particularly, to multi-node unified communications systems, including telephony systems such as telephone call management auto attendant and voice messaging systems, and to electronic messaging systems such as email instant messaging (IM), and short message service (SMS) systems.

BACKGROUND

Telephone systems and telephone service providers offer a wide range of voice communication services, including call answering, voice messaging, and automated attendant services. With the trend towards combining voice communications with non-voice electronic communications (e.g., email, IM, SMS, facsimile), unified messaging systems have emerged. In unified messaging systems, multiple types of communication services are available to a subscriber. For example, a subscriber's voice, facsimile, email, IM, SMS, and other messages may be stored on such a system and made available to the subscriber upon request. The subscriber may be able to log into such system from a remote location, and receive (e.g., view, listen to) voice and electronic messages, as well as send electronic messages and originate telephone calls from the system. The system may also include groupware applications. ("Groupware" generally refers to applications that enable collaboration of a group of subscribers, such as employees of a company; groupware may provide services for communication including email, contact management, and scheduling.) The system may also include additional capabilities intended to facilitate communications with the subscriber when the subscriber is connected to the system remotely through a telephone network. For example, the system may include a text-to-speech converter for reading to the remotely-connected subscriber stored facsimile and email messages, The system may include multiple "nodes" in different geographic locations, for example, in different areas of a building, different buildings, different cities, different states, or even different countries. Multiple nodes may also be physically located in the same place. The nodes are interconnected. Each of the nodes may be configured to provide messaging services (e.g., receiving, creating, sending messages) to a particular subgroup of its associated subscribers and possibly to other subscribers, for example, to the particular subgroup at the same geographical location as the physical location of the node. Configuration information and subscriber data are typically stored on a core node (as distinguished from other, non-core nodes). When the core node is down, for example, because of maintenance and hardware or software failures, normal processing of calls and other messages may be disrupted.

Scaling the system up by increasing the number of nodes tends to slow down message processing in the system, and particularly processing of messages within the core.

A need exists in the art to improve reliability of messaging systems when core nodes become unavailable, and to make such system more scalable.

SUMMARY

The present invention is directed to multi-node messaging systems, methods for operating multi-node messaging systems, and machine-readable articles of manufacture storing code for operating multi-node messaging systems that help satisfy this need. System configuration data and/or subscriber data may be stored on the core node and replicated to the non-core nodes, enabling the non-core nodes to provide certain functionality when the core node is inaccessible for some reason.

In an embodiment, the invention herein disclosed is a messaging system that includes a core node configured to provide central repository services for storing system configuration and/or subscriber information, and one or more non-core nodes, each non-core node of the one or more non-core nodes being in communication with (or including) telephone switching equipment (e.g., PBX). Each non-core node is configured to provide a platform for running telephony and/or voice user interface applications (TUI/VUI) for processing telephone calls. The core node and the non-core nodes are configured to replicate at least a portion of the system configuration information and/or subscriber information stored on the core node to the non-core nodes. In aspects of the invention, all or a plurality of the non-core nodes being in communication with a single telephone switching equipment.

In an embodiment, the invention herein disclosed is a method of operating a multi-node messaging system that includes a core node and one or more non-core nodes. Each non-core node of the one or more non-core nodes is in communication with (or includes) telephone switching equipment associated with the non-core node. The method includes storing system configuration information of the messaging system on the core node, replicating at least a portion of the system configuration information stored on the core node to each non-core node, and running at each non-core node one or more telephony and/or voice user interface applications for processing telephone calls.

In an embodiment, the invention herein disclosed is a machine-readable storage medium (e.g., a memory) with program code stored in the medium. When the program code is executed by at least one processor of a multi-node messaging system that includes a core node and one or more non-core nodes, each non-core node of the one or more non-core nodes being in communication with (or including) telephone switching equipment, the code configures the system to perform the following steps: (1) storing system configuration and/or subscriber information of the messaging system on the core node, (2) replicating at least a portion of the system configuration and/or subscriber information stored on the core node to each non-core node, and (3) running at each non-core node one or more telephony and/or voice user interface applications for processing telephone calls.

In an embodiment, the invention herein disclosed is a messaging system for servicing a plurality of subscribers. The messaging system includes a primary core node configured to provide central repository services for storing system configuration and subscriber information of the messaging system. The system also includes a plurality of non-core nodes, each non-core node of the plurality of non-core nodes being configured to provide a platform for running telephony user interface applications and voice user interface applications for processing telephone calls. The system further includes a failover core node configured to provide the central repository services for storing system configuration and subscriber information when the primary core node is unavailable, for example, due to failure. The primary core node and the failover core node are configured to replicate the system configuration and subscriber information stored on the primary core node to the failover core node. The failover core node is configured to take over core node functions of the messaging system when the primary core node in unavailable.

In an embodiment, the invention herein disclosed is a messaging system for servicing a plurality of subscribers. The system includes a core node configured to provide central repository services for storing system configuration and subscriber information, a plurality of non-core nodes, and telephone switching equipment (for example, a single PBX) in communication with each non-core node of the plurality of non-core nodes. Each non-core node is configured to provide a platform for running telephony user interface applications and voice user interface applications for processing telephone calls of the plurality of subscribers. The core node and each non-core node are configured to replicate at least a portion of the system configuration and subscriber information stored on the core node to each non-core node so that the messaging system can provide at least partial services to the subscribers of the system and to outside callers when the core node is unavailable.

In an embodiment, the invention herein disclosed is a messaging system that includes a core node and one or a plurality of non-core nodes. The core node includes a core store configured to perform central repository services for system configuration and subscriber information, and for storing received and sent messages of subscribers of the system. The core store is an authoritative store of the system. The messages may include telephone messages, email messages, facsimiles, instant messages, short message service messages, and possibly other types of messages. Each non-core node of the plurality of non-core nodes is configured to provide a platform for running telephony, email, facsimile, IM, SMS and possibly other types of user interface applications for processing the messages. Each non-core node includes a core store configured to store at least some of the messages. The core node and the non-core nodes are configured to replicate at least a portion of the system configuration and subscriber information stored on the core node to each of the non-core nodes.

These and other features and aspects of the present invention will be better understood with reference to the following description, drawings, and appended claims.

DETAILED DESCRIPTION

Figure 1:
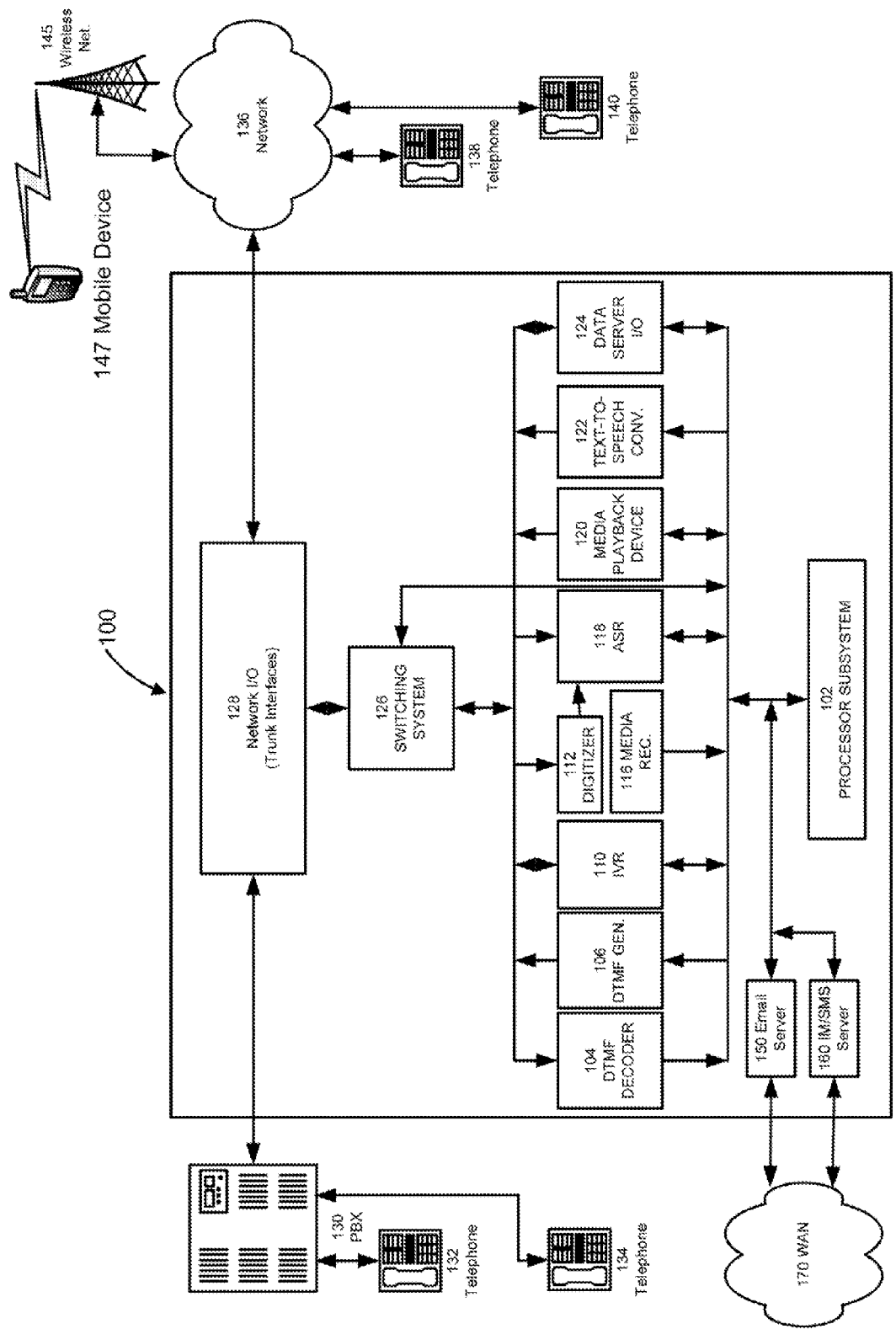
FIG. 1 is a high-level block diagram illustrating selected elements (hardware blocks, software process blocks, and/or combined hardware-software blocks) of a node of an exemplary messaging system configured in accordance with one or more aspects of the present invention.

In this document, the words "embodiment," "variant," and "configuration" refer to particular apparatus, process, or article of manufacture, and not necessarily to the same apparatus, process, or article of manufacture. Thus, "one embodiment" for a similar expression) used in one place or context can refer to a particular apparatus, process, or article of manufacture; the same or a similar expression in a different place can refer to a different apparatus, process, or article of manufacture. The expression "alternative embodiment" and similar phrases are used to indicate one of a number of different possible embodiments. The number of possible embodiments is not necessarily limited to two or any other quantity. Characterization of an embodiment, variant, apparatus, process, or article of manufacture as "exemplary" means that the item so characterized is used as an example. Such characterization does not necessarily mean that the embodiment, variant, apparatus, process, or article of manufacture is preferred over other such items; the embodiment, variant, apparatus, process, or article of manufacture so characterized may but need not be currently preferred over other such items.

A "node" of a messaging system is generally understood as a subsystem interconnected with other such subsystems of the messaging system, providing messaging services (e.g., receiving, creating, sending messages) to a particular subgroup of its associated subscribers, and possibly to other subscribers of the system, or to all of the system's associated subscribers. The messages may include telephone calls, facsimiles, email, and SMS messages. When all nodes are connected to one PBX for scalability purposes, for example, any subscriber may be serviced by any node. See also the discussion in the previous section.

The word "subscriber" signifies a person who can receive and send messages using a particular messaging system. Generally, a subscriber has a preexisting association with the system. For example, a subscriber may be an employee of an organization using the messaging system. A "subscriber" may be able to place a telephone call or otherwise log (from the messaging system or remotely) into the messaging system, and access at least limited functionality of the system.

A "mailbox" or a "digital networking mailbox" is a link or addressable target for sending and forwarding messages within a networked messaging system, such as a voice messaging system. Mailboxes are described in more detail in a commonly-assigned U.S. patent application Ser. No. 11/126,624, entitled Messaging System Configurator, filed on May 11, 2005, which application is incorporated by reference herein in its entirety, including figures, tables, and claims.

"System configuration information" is a collection of settings that have been chosen to customize a messaging system for specific needs and applications. Such information may include description of and data regarding external devices and systems to which the messaging system and its nodes are connected. System configuration data may include, for example, descriptions of brands of PBXs; connection methods to the PBXs; parameters defining the PBX connections; which external email stores are connected; and properties of the email store connections, such as server names, logon credentials, and similar data. System configuration data may also include customizations of the system selected by the customer, such as the features that have been enabled and other parameters that control the system, "Subscriber information" is a collection of properties of a subscriber that may be settable (selectable) by administrators, the subscriber, or both. These properties include items such as the subscriber's name, mailbox number, extension, password, recorded name, recorded personal greeting(s), notification settings, find me and follow me settings used for forwarding a call to a particular targeted subscriber, class of service, individually enabled features, and similar settable items. Generally, administrators and subscribers running applications to view or change configuration or subscriber information settings access a system's core, either directly or through a connection to core services. Administrators control system configuration and management functions relating to the system.

Figure 3A:
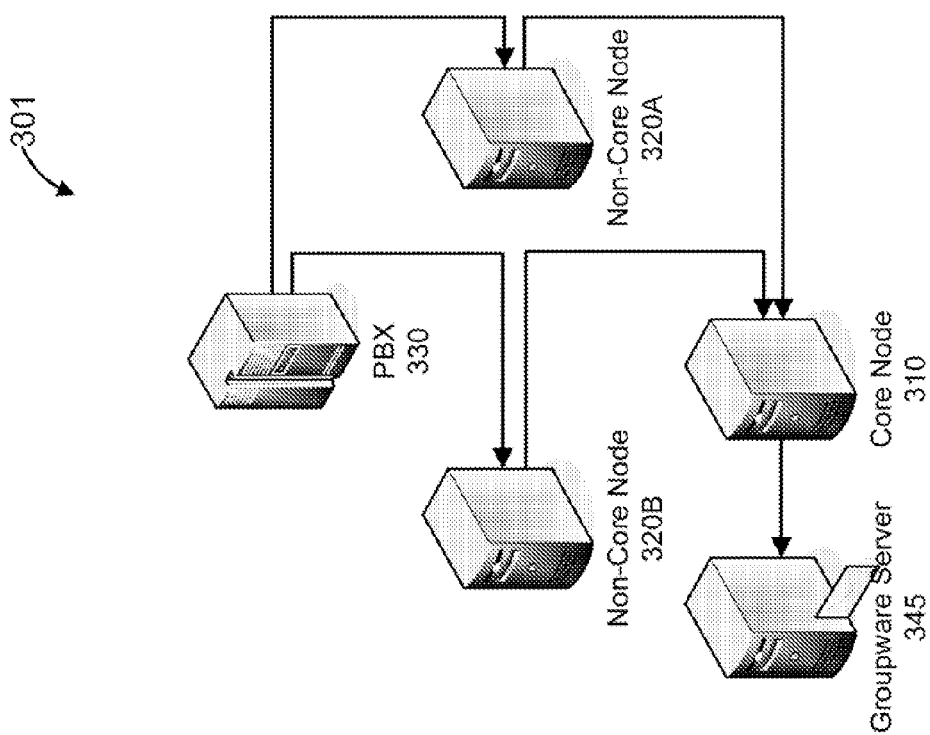
FIG. 3A is a high-level block diagram illustrating selected nodes, server, and PBX of a Multiple Nodes Scalability messaging system configured in accordance with one or more aspects of the present invention.
Figure 3B:
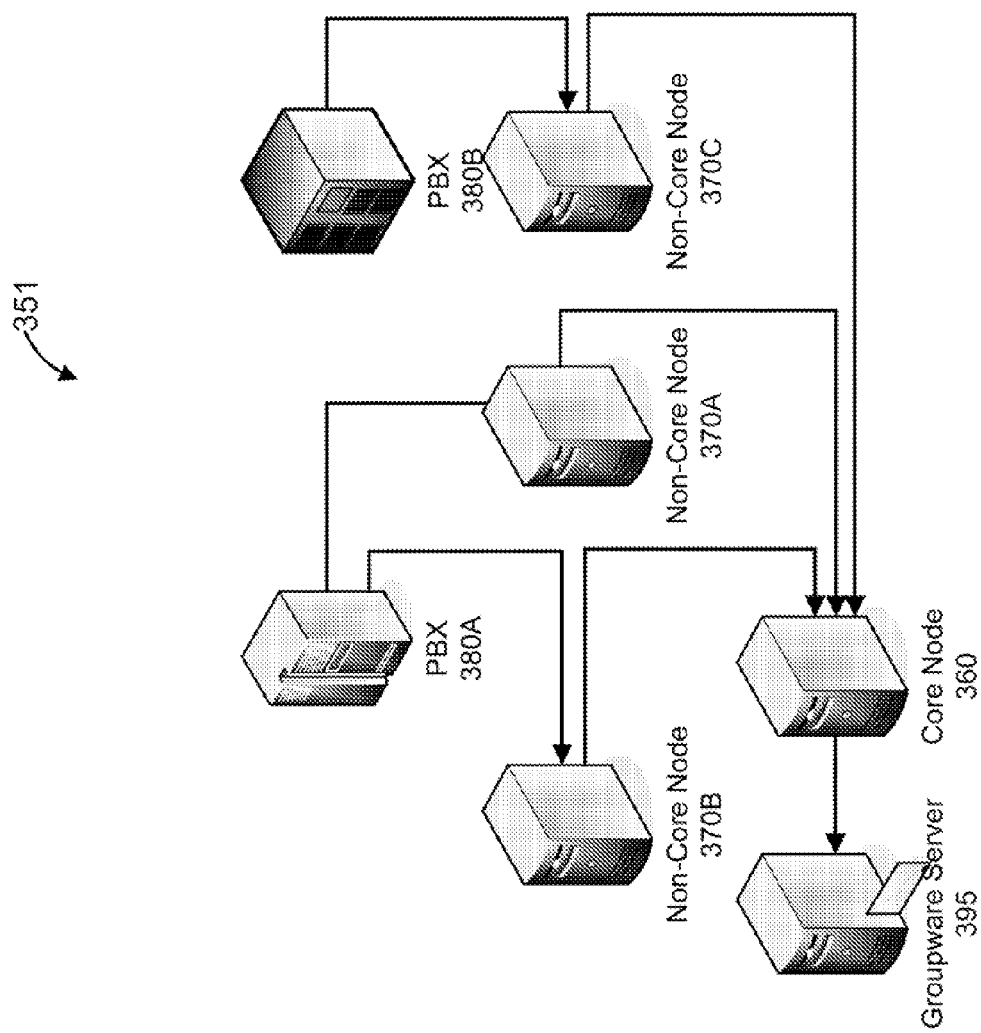
FIG. 3B is a high-level block diagram illustrating selected nodes, server, and PBXs of a Campus Environment messaging system configured in accordance with one or more aspects of the present invention.

"Inter-system message networking" refers to the ability to send a message from one voice mail system to another voice mail system, as opposed to message networking within the same multi-node system such as those illustrated in FIG. 3A and FIG. 3B and in the commonly-assigned U.S. patent application Ser. No. 11/126,624, entitled Messaging System Configurator, filed on May 11, 2005. In contrast to a multi-node messaging system, different voice mail systems may ran independently with each system having its own set of subscribers and PBX connections, and each system may be owned and/or operated by a different company.

"Status monitoring" and similar expressions refer to monitoring the operating condition of the system, e.g., monitoring and displaying line status that shows which phone lines are in use, by whom, and for how long, "Health monitoring" refers to monitoring of the nodes of a multi-node system to determine whether the nodes are operating properly.

"Hot standby" refers to a contingency or fallback approach to maintaining system or component (e.g., node, server, or PBX) availability, whereby a second system/component, with the same configuration as the main system/component is kept running, possibly "mirroring" the processing of the main system/component, ready to take over the processing load instantaneously in response to a failure of the main system/component. "Warm standby" refers to a method of maintaining redundancy in which the secondary (or backup) system or component runs in the background of the primary system/component Data is mirrored to the secondary system/component server at regular intervals, which means that there are times when both servers do not contain the exact same data. "Failover" denotes the capability to switch over automatically to a redundant or standby system or component of a system upon failure or otherwise abnormal termination of the previously active system or component. Failover operation takes place without human intervention and generally without warning.

The words "couple," "connect," and similar expressions with their inflectional morphemes do not necessarily import an immediate or direct connection, but include connections through mediate elements within their meaning.

"Campus environment" refers to a site with multiple buildings on a single real estate parcel, or closely spaced real estate parcels, in which there may be one or more PBXs. Typical campus environment examples include a university, school, large corporation, and hospital sites.

"Posting" is the process of delivering a message. This process may include the act of making the message available in the subscriber's message list. This term may also include the ancillary processes, such as turning on a message waiting indicator (MWI), sending a message notification (callout, SMS, email, etc.). It may also include the process of expanding distribution lists to deliver the message to multiple recipients identified on the list, depositing the message in an email store if the subscriber is using server-based unified messaging, or passing the message off to the networking module for delivery to a remote system, In the context of messages store and message storage, "local" means that the messages are stored in the native message store of the messaging system. Subscriber accounts may be configured to use either local store or groupware store, depending on specific needs; there is no requirement that a single message store be used system wide.

"MMC" refers to Microsoft Management Console, which is Microsoft's main administrative application.

"AD" and "Microsoft Active Directory" refer to Microsoft's directory service.

"SOAP" refers to Simple Object Access Protocol, a technology for packaging web service requests and responses; a SOAP server is a web service/server that serves up an embodiment's administrative and operational data, e.g., messages.

"Private branch exchange" (PBX) is generally understood as telephone switching equipment or a telephone exchange that serves a particular business or office. These terms encompass "private automatic branch exchanges" (PABXs). A PBX may be, for example, circuit switched, and Internet Protocol based. Some PBXs support both circuit and IP switching within the same equipment. Other PBXs are also possible.

Other and further definitions (both explicit and implicit) and clarifications of definitions may be found throughout this document. All the definitions are intended to assist in understanding this disclosure and the appended claims, but the broad scope of the invention should not be construed as strictly limited to the definitions, or to the particular examples described in this specification.

Reference will now be made in detail to several embodiments of the invention that are illustrated in the accompanying drawings. Same or similar reference numerals may be used in the drawings and the description to refer to the same or like items. The drawings are in simplified form, not to scale, and omit apparatus elements and method steps that can be added to the described systems and methods, while possibly including certain optional elements and steps.

FIG. 1 is a high-level block diagram of an exemplary node 100 of a unified messaging system that can be used to implement processes described in this document. The node 100 may be a non-core node, or a core node that also provides functionality of non-core nodes. The node 100 includes telephony interfaces 128 that couple the node 100 to a network 536 and to switching equipment 130. In the embodiment illustrated in FIG. 1, the switching equipment 330 is a circuit switched Private Branch Exchange (PBX), while the network 136 is a public switched telephone network (PSTN). In other embodiments, the switching equipment may be of a different kind, for example, an IP PBX, an automatic call distributor or ACD, central office switches, and possibly peer to peer IP switches. (ACDs are often found in offices that, handle large volumes of incoming phone calls from callers who have no specific need to talk to a certain person, but want to talk to a person who is ready to serve at the earliest opportunity.) The network 136 can be, for example, the Internet, an intranet, an extranet, a virtual private network (VPN), a local area network (LAN), a wide area network (WAN), an enterprise network, or a private switched network. The network 136 may be coupled, to cellular radio networks, such as the wireless network 145, so that the unified messaging system of which the node 100 is a part can receive inbound calls from cellular telephones and other mobile devices (e.g., mobile device 147), and place outbound calls to such mobile devices.

The node 100 may be able to interface simultaneously with several different networks, such as the networks listed above. The node 100 may also interface with several different switches. For example, the unified messaging system may be connected at the same time to a public switched telephone network and to a LAN, WAN or Internet, managing (1) Voice over Internet Protocol (VoIP) calls switched by an Internet Protocol PBX, (2) PSTN calls switched by a conventional circuit switched PBX, (3) receiving and sending email through an email server, (4) receiving and sending IM messages through an IM server, and (5) receiving and sending SMS messages through an SMS server. The PBX 130 and/or other switching equipment may be included in the node 100.

Returning to the embodiment illustrated in FIG. 1, the telephony interfaces 128 may include analog, digital, and VoIP trunks or stations. A switching matrix 126 is interposed between the telephony interfaces 128 and other components of the node 100, selectively connecting inbound and outbound calls between various constituent components of the node 100. In addition to the switching matrix 126 and the telephony interfaces 128, the constituent components of the node 100 include a processor subsystem 102, a dual tone multi-frequency (DTMF) decoder 104, a DTMF generator 106, an interactive voice response (IVR) module 110, an audio digitizer 112, a media (audio) recorder 116, an automatic speech recognition (ASR) module 118, a media (audio) playback device 120, a text-to-speech converter 122, and a data server interface 124.

The processor subsystem 102 may include one or more processors with supporting circuitry and chipsets, such as microprocessors, memories, and interface circuits that are known to a person skilled in the art. In one embodiment, the processor subsystem 102 includes a general purpose microprocessor and a digital signal processor (DSP). The processor or processors of the subsystem 102 execute program code stored in one or more memories. The code may be loaded from another machine-readable medium, such as a CD, DVD, flash memory, floppy or hard drive, or a similar device. The code may also be loaded via a network.

The processor subsystem 102 is coupled to an email server 150 and an IM/SMS server 160, to enable the subscribers of the unified messaging system to send and receive email messages and instant/SMS messages through a LAN or wide area network 170 (e.g., the internet). The node 100 may also use the network 170 to communicate with other nodes of the unified communication system, including both core and non-core nodes. SMS messages may also be sent through a cellular telephone device, which may be directly connected to the system using, for example, a serial or USB connection.

The DTMF decoder 104 detects dual tone multi-frequency signals in telephone calls and generates corresponding signals readable by the processor subsystem 102. For example, an external or outside caller (which caller may also be a subscriber) can input DTMF signals from the keypad of the telephone 140 when asked by the IVR module 110 to make a menu selection, hi response to the DTMF signals, the processor subsystem 102 may cause the node 100 and the system of which it is a part to perform the functions selected by the caller. Voice input can be used instead of or in addition to the DTMF input.

The DTMF generator 106 generates DTMF signals under control of the processor subsystem 102. For example, an Automated Attendant system may place an internal call when an outside caller requests a specific subscriber, to transfer the caller to the subscriber's extension. As another example, the node 100 may generate the DTMF signals to place an external call. The node 100 may place the external call for a subscriber calling from outside, so that subscribers who are traveling can call and log into the node 1.00, and have their calls placed from the node 100 or more generally from the messaging system to which the node 100 belongs. External calls may also be placed when the node 100 implements a "Call Me Back" feature, which allows a subscriber to call and log into the node 100, and have the system immediately call the subscriber back at a designated number, thereby lowering the subscriber's telecommunication charges (e.g., air time and long distance charges). Land lines, most of European cellular network operators, and certain U.S. cellular network operators do not charge for incoming calls. As still another example, the node 100 may generate DTMF signals when placing an external call to notify a subscriber regarding messages left for the subscriber. The messages may include, for example, voicemail messages, facsimile messages, email messages, instant messages, SMS messages, and preprogrammed reminders.

The IVR module 110 automates certain interactions between the callers and the node 100. Interactive voice response can provide audio prompts to request information and store responses from a caller. The responses can be in the form of touch-tones generated by pressing telephone keys, or voice responses. Voice responses may be converted to digital information by voice recognition signal processing of the ASR module 118. Interactive voice response may be used for automatic call distribution or service activation or changes. If the caller is a subscriber, the node 100 may use the IVR block 110 to verify the subscriber's identity, and then play received and stored messages intended for the subscriber, as well as notify the subscriber of received email, facsimile, and other messages. The node 100 may also allow the subscriber at a remote location to change answering and forwarding options, as well as other subscriber-specific data. For other callers, the node 100 may provide interactive functionality for identifying a proper recipient for the call, and navigating among the various extensions available on the PBX 130 or more generally on the messaging system to which the node 100 belongs.

The digitizer 112 converts received analog audio signals into digital form.

The media recorder 116 stores the audio signals, under direction of the processor subsystem 102. For example, the media recorder 116 may record messages left by callers for the subscribers of the node 100 or of the messaging system. In one embodiment, the media recorder 116 includes an interface to mass storage devices, such as an interface to a redundant array of inexpensive disks (RAID). The mass storage devices may be a part of the node 100 or of the unified communication system, or be separate from the node 100 and the messaging system.

The ASR module 118 recognizes spoken words and phrases in audio streams of telephone calls, and generates corresponding signals readable by the processor subsystem 102. The ASR module 118 may be used in conjunction with the IVR module 110 to interpret callers' voice input to the node 100. In response to the menu selections offered by the IVR module 110, a caller can speak the desired selections, such as name or extension number of the called (target) party. The ASR module 118 identifies tire name or the extension number (or another selection) from the spoken words, and sends corresponding signals to the processor subsystem 102. The processor subsystem 102 then causes the node 100 or the system to perform die functions selected by the caller, for example, connecting the caller to the targeted person or extension.

The media playback device 120 plays audio files to the callers and subscribers. For example, the playback device 120 may include an interlace to the mass storage devices used by the media recorder 116. The playback, device 120 can access the messages stored by the media recorder 116, and play the messages to the subscribers upon request and after proper identification.

As implied by its name, the text-to-speech converter 122 converts text into speech. The text-to-speech converter 122 may enable a subscriber at a remote location to access (over a telephone connection or the Internet, for example) facsimile, email, and other messages sent to the subscriber and received by the system, where textual information is converted to its synthesized spoken equivalent.

The data server interface 124 provides access to various data files that may be used by the node 100 or requested by the subscribers or callers of the node 100. The data available for retrieval through the data server interface 124 may include, for example, subscriber groupware information, such as email, contacts, and calendar entries. The data server interface may also store and retrieve customer orders, and provide corporate data to the callers. In one example, the data server interface 124 includes interfaces to Microsoft Exchange® and Lotus Domino® servers. The data server interface 124 may be connected to the network 170, The DTMF decoder 104, the IVR module 110, and the ASR module 118 may also be used when a subscriber sends email and IM/SMS messages from the unified communication system.

It should be noted that the various modules illustrated in FIG. 1 can be implemented in hardware, in software, or as a combination of hardware and software components. For example, the DTMF decoding and automatic speech recognition functions of modules 104 and 118 may be performed by the digital signal processor or another processor of the processor subsystem 102. The lines dividing the various modules of the node 100 in FIG. 1. (and similar lines in other Figures) should therefore be understood as logical dividers used mainly for illustration and ease of description at a relatively high conceptual level.

For certain additional details of the node 100, see commonly-assigned U.S. patent application Ser. No. 10/932,745, entitled Apparatus and Method for Personalized Call Acknowledgement, filed on Sep. 2, 2004, which application is incorporated by reference herein in its entirety, including figures, tables, and claims.

Figure 2:
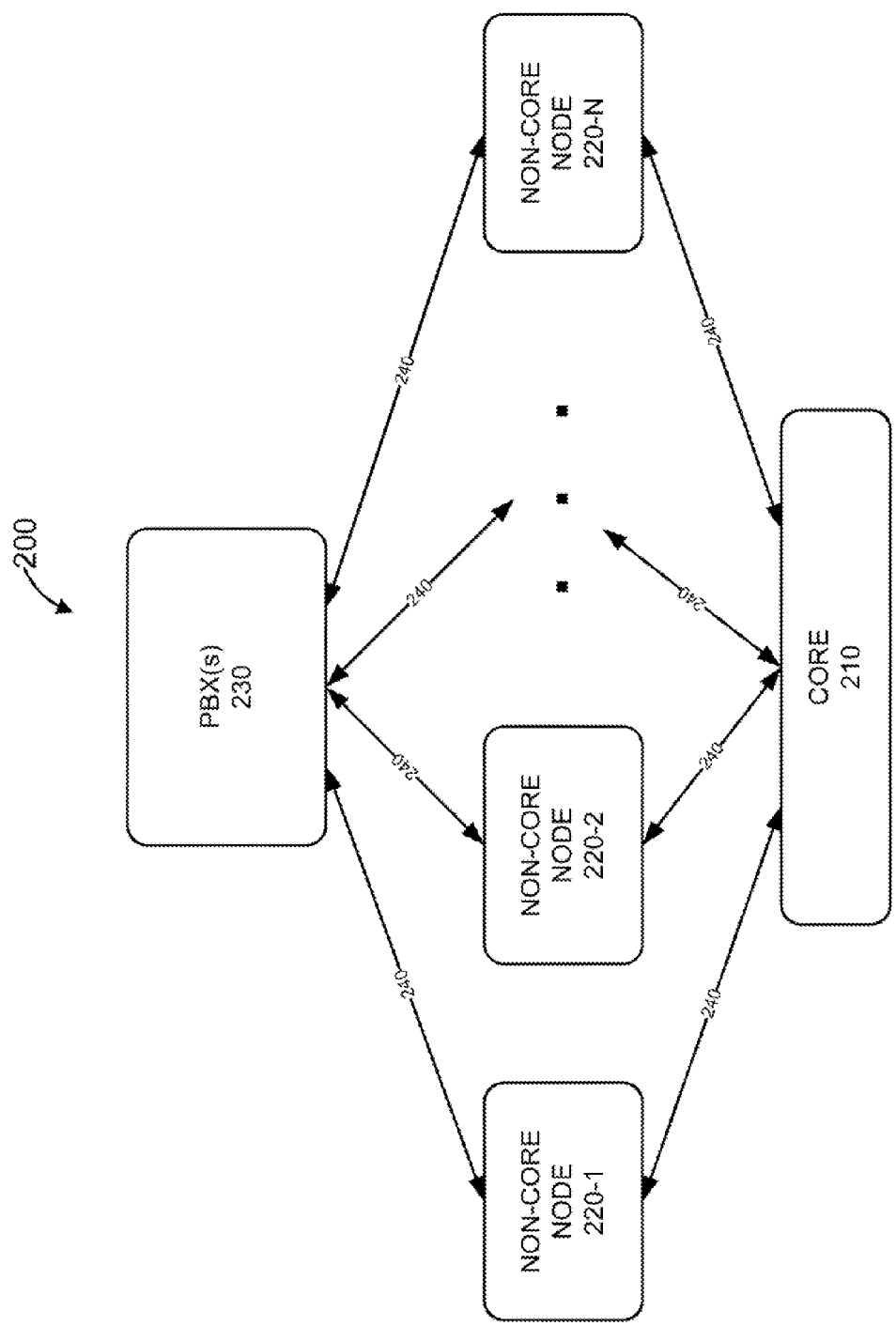
FIG. 2 is a high-level block diagram illustrating selected elements of a messaging system configured in accordance with one or more aspects of the present invention.

FIG. 2 is a high-level block diagram of a unified messaging system 200 configured in accordance with embodiments of the present invention, as is more fully described throughout this document. The system 200 includes a single core node 210, a plurality of non-core nodes 220, and one or more PBXs 230. The core node 210, non-core nodes 220, and the PBX 230 may be interconnected through wide area and telephone networks as shown in FIG. 1 (the networks 170 and/or 136). The arrows 240 show network Interconnections between the system components, for example, interconnections through the LAN or wide area network. (PBX connections may be circuit switched or IP.)

The core node 210 (or simply the "core") is configured to provide a central repository for system configuration information and subscriber information. The core node 210 is also configured to provide centralized administrative and subscriber access to configuration and subscriber information. The core node 210 is further configured to provide other centralized services, such as notification of received messages, inter-system message networking, and status monitoring, some of which may not be appropriate for duplication on multiple or all of the nodes (i.e., functions that are not appropriate to be running individually on the individual non-core nodes, and that are centralized functions running on the core). Still further, the core node 210 may be configured to provide functions of a non-core node.

An exemplary non-core node 220 (e.g., 220-1, 220-2, . . . 220-N) is configured as a platform for running telephony user interface (TUI) and/or voice or speech user interface (VUI) applications which process calls and other messages. TUI generally refers to the interlace for user/subscriber or caller interactions with the telephone system, typically through an automated phone system with keypad responses, which may use the DTMF decoder and IVR modules. VUI generally refers to the interface for user/subscriber or caller interactions with the telephone system through voice/speech platform, which may use the ASR and IVR modules. The communications between and among non-core nodes and between and among core and non-core nodes may be effected through Internet Protocol (IP) connections, such as the connections 240. The unified messaging system may be configured on a LAN/WAN that is fast enough to provide for real time access to data from the core node during normal operation.

All software components may be run on a single node which contains both core and non-core node elements.

The core node 210 may contain and be configured for the components/applications/services on the following non-exhaustive list:

1. One or more databases and one or more database servers.
2. One or more data service module(s) that provide application programming interfaces (APIs) for application access, implement business rules, and read/write data to databases and/or one or more groupware servers.
3. One or more modules for message notification processing services, for example, an SMS notification service that sends notifications using a cellular modem, sending SMTP email notifications, and a central notification server that allocates notification callout activity to various nodes that have appropriate phone lines for execution.
4. One or more networking service modules, such as an inter-system networking module for inter-system voice mail networking, which implements communication protocols with foreign voice mail systems (in some embodiments there is only one of these modules per system).
5. One or more system control and health monitoring modules, such as line status monitoring, health monitoring, and diagnostic monitoring.
6. Call and other event scheduling modules (such as daily maintenance activity scheduling, which may include backup, synchronization with third party services, speech recognition grammar management, auto-deletion of aged messages, database maintenance, automatic report generation, and callouts for notification).

7. One or more administrative configuration interfaces. One embodiment includes a primary administrator interface that is used by administrators to configure features, create mailboxes, and for similar activities. This embodiment also provides a report interface for report generation, a diagnostic interface, support for third party administration applications for configuring the system, and support for multiple interfaces that allow subscribers to control the options of their respective mailboxes.

8. One or more web servers.

9. One or more backup/restore/archive service modules.

10. One or more administration and reporting applications. These applications may be run on a separate client system. In one embodiment such applications include a locally-run Control Panel application for base system setup, which runs only locally: and a remotely-run primary administration GUI, which is mostly for subscriber administration. Administration applications/interfaces may also allow other applications (both of the messaging system on which they are implemented and of third party systems) to administer subscribers. This may include an MMC Snap-In to the Microsoft Active Directory administration tool, which allows for subscriber administration. Reports, line status display, and Diagnostics applications may also run on a remote client.

Note that not all core components are required in all configurations, and that core components may be distributed to multiple physical servers, either co-located or not.

In some variants, the core node 210 is built on a high availability server to limit possible down time. This could be a Stratus non-stop computing system, or servers configured for Microsoft® cluster server.

A core or a non-core node may contain and be configured for the components/applications/services on the following non-exhaustive list:

1. One or more circuit switch telephone interfaces.
2. One or more IP telephony interfaces.
3. One or more PBX integration interfaces.
4. One or more TUI applications.
5. One or more VUI applications.
6. One or more speech recognition services/modules.
7. One or more databases and one or more database servers with replicated databases.
8. Local cache management for caching of audio recording, such as spoken names, greetings, and messages.
9. Local line management applications. Telephone line management and control may include on/off hook control, detector of telephony signals (DTMF, hang up, call progress, etc.), audio player (media playback device) and media recorder, text to speech converter, and ASR.
10. Local access to an external groupware store.

Not all node components are required in all configurations.

In some variants, each node is located in proximity of its associated PBX, for example, located within the same building, to enable serial or digital station set connections between the node and its associated PBX. In some variants, each node includes its associated PBX.

Some or all of the configuration and subscriber data may be replicated from the core node 210 to one or more non-core nodes 220, or to all of the non-core nodes 220. Replication may be performed in real-time or near real-time, periodically (in equally spaced time intervals), sporadically, or otherwise. (Real or near real-time replication here means that in most cases a database update will be replicated by the time someone next has a use for the database data; in the case of speech data, in some embodiments, the delay can be up to one or two seconds that may be needed to retrieve a recording from the core prior to starting playback.) Individual non-core nodes may rely on the replicated data to present user/subscriber services that do not involve the updating of the configuration and/or subscriber data. In some variants, individual non-core nodes 220 rely on the replicated data to provide all services that do not involve the updating of die configuration or updating of the subscriber data. This scheme allows the non-core nodes 220 to continue to send, receive, and process calls and other messages when the core node 210 is not available due to system failure, communications failure, maintenance activities, or other reasons. For example, if the non-core node application is an automated attendant, the non-core node can route a call (or another message) to the appropriate subscriber without relying on the core node, possibly including routing the call (or message) to a subscriber at another node or extension on a PBX associated with a different non-core node. As another example, non-core nodes can take messages from callers when the core node is not available. The messages may be queued for posting and delivery when the core node becomes available again. Moreover, a single logical unified communication system with nodes associated with individual PBXs distributed in a campus or wider area may be formed. Each individual node may be closely distributed next to the PBX(s) with which the node is associated, while maintaining a single logical system. The non-core nodes may use the replicated configuration and/or subscriber data even when the core node 210 is available; this, feature, however, is not a requirement, so that the non-core nodes may use the configuration and subscriber data from the core when the core is available, notwithstanding the availability of the replicated data on the non-core nodes.

In some variants, the non-core nodes may also master their own databases and be semi-autonomous. In other words, database updates may be allowed to semi-autonomous nodes without going through the core node database server. For example, a message may be posted on a particular non-core node, but the message may not be available for access from other nodes. This would be useful in the situation where the particular node is in a different city or building on a campus and messages are seldom sent to subscribers outside of the building.

The non-core nodes 220 may be configured directly to access messages, calendar, and contact information from external groupware applications. This configuration allows each of the non-core nodes 220 to continue to provide access to the groupware information when the core node 220 is unavailable. Message requests, calendar requests, and other groupware requests may be made to groupware directly from the non-core nodes 220, allowing the non-core nodes 220 to continue to provide full or partial service even when the core node 210 is unavailable.

Each of the nodes 220 may be configured to operate independently of other nodes. If a node 220 fails in this configuration, the operation of other nodes need not be affected, allowing the system to continue to operate, possibly in a reduced capacity mode.

The unified messaging system and its nodes 220/210 may be configured to provide node failover, depending on the ability to redirect phone lines (the ability to redirect phone lines is generally a function of the PBX). For example, if a node 220-1 fails, its associated phone lines may be redirected to another node, for example, 220-2 or 210. Hot standby and warm standby may also be available. In this way, multiple nodes may be used to construct a large scale unified messaging system with its reliability enhanced by the use of multiple nodes, eliminating or reducing the system's vulnerability to a single point of failure. Because the replicated data at a particular node 220 may be used when providing service to subscribers and outside callers, the subscribers and the callers may access the node for service even when the core node 210 is down. Furthermore, with failover capability, subscribers and outside callers may continue to access those subscribers served primarily by a failed node (either core or non-core). In a large scale system where multiple nodes are connected to the same PBX for scalability, there may be no relationship between a subscriber and a non-core node since any non-core node may answer a call on behalf of the subscriber.

A single logical system, such as the unified messaging system 200, may be constructed to span a campus or a wider area (with nodes and PBXs in different cities, for example) by placing nodes at the various PBX interface points, some or all of the non-core nodes being connected to a single core node. This allows for a single unified messaging or communications system to serve multiple PBXs at multiple locations. The components of the core node such as the node 210 may be distributed among multiple computer systems.

Data replication, node failover procedures, and additional backup procedures can be used to keep a standby site up to date for disaster recovery situations, such as a complete failure of the core node 210.

Not all of the data may need to be replicated. Certain data may or may not be replicated. In some embodiments, replicated data includes subscriber information and system configuration information, while not replicated data includes message information, machine configuration, schedule, and MWI database. On demand or subscriber-selectable replication may include recordings of messages, greetings, and subscriber and other names.

The system 200 is configured to allow a person logged in as administrator to add, change, and delete system configuration by interacting with die core components of the core node 210. Some of the configuration data may be also added, changed, or deleted by a person logged in as a subscriber. Generally, a non-administrator subscriber may be enabled to edit (i.e., add, change, delete) the information that relates to the subscriber and does not a fleet other subscribers or system operation as a whole. An administrator may be enabled to edit all configuration data. Several levels of administrative privileges may also be provided. Updates made by subscribers at the non-core nodes 220 may be written directly to the core node 210. If the core node 210 is unavailable, updates may be disallowed or queued, depending on the type of the particular update. Messages left for a targeted subscriber may be queued locally on the particular non-core node 220 associated with the targeted subscriber, and then sent to the core node 210 for posting. Groupware access may be processed directly at each non-core node 220, without involving the core node 210. This includes access and updates to the groupware information. If the core node 210 is unavailable, in some variants message posting and notifications triggered by groupware access may not be processed until the core node 210 becomes available.

Some embodiments do not normally queue updates, because if the caller calls back and attempts to change the queued item again, the queued update is not reflected in the state of the item that the user thinks is being changed. In some cases where data integrity can be assured (and therefore user confusion avoided), queuing may be implemented. It is generally safe to queue incoming messages because users will not see the messages until the messages are delivered through the core node.

For certain additional configuration data details and administrative/subscriber editing of configuration data, see the commonly-assigned U.S. patent application Ser. No. 11/126,624, entitled Messaging System. Configurator, filed on May 11, 2005.

FIG. 3A illustrates selected nodes, server, and PBX of a messaging system 301, referred to as a Multiple Nodes Scalability system, and configured with data replication as described above. The system 301 includes a core node 310, two non-core nodes 320A and 320B, a PBX 330, and a groupware server 345. Each of the nodes 310/320 may he configured as has been described above in relation to the nodes 210 and 220 of FIG. 2, and the node 100 of FIG. 1. Here, both non-core nodes 320A/B are served by a single PBX 330.

In the system 301, the core node 310 contains a database, administration interfaces, and a graphical user interface for client access support. Each of the non-core nodes 320A/B contains connections to phone lines, a replicated database, temporary message storage, and an interface to the PBX 330. The core node 310 may have phone lines, or be implemented without phone lines. The groupware server 345 is used for unified messaging and access to groupware calendar and contacts, The single PBX feature is not a requirement of the invention. Thus, FIG. 3B illustrates selected blocks of a messaging system 351, referred to as Campus Environment System, which is also configured with data replication as described above. The system 351 includes a core node 360, three non-core nodes 370A/B/C, PBXs 380A/B, and a groupware server 395. Each of the nodes 360/370 may be configured as has been described above in relation to the nodes 210 and 220 of FIG. 2, and the node 100 of FIG. 1. Here, the PBX 380A is connected to and normally provides services to subscribers at the non-core nodes 370A and 370B, while the PBX 380B is connected to and normally provides services to the subscriber at the non-core node 370C, In the system 351, the core node 360 contains a database, administration interfaces, and a graphical user interface client access support. Each of the non-core nodes 370A/B/C contains phone lines, a replicated database, and temporary message storage. The non-core nodes 370A/B/C support phone lines and interface to the PBXs 380A/B. The core node 360 may have phone lines, or be implemented without phone lines. The groupware server 395 is used for unified messaging and access to groupware calendar and contacts.

Figure 4:
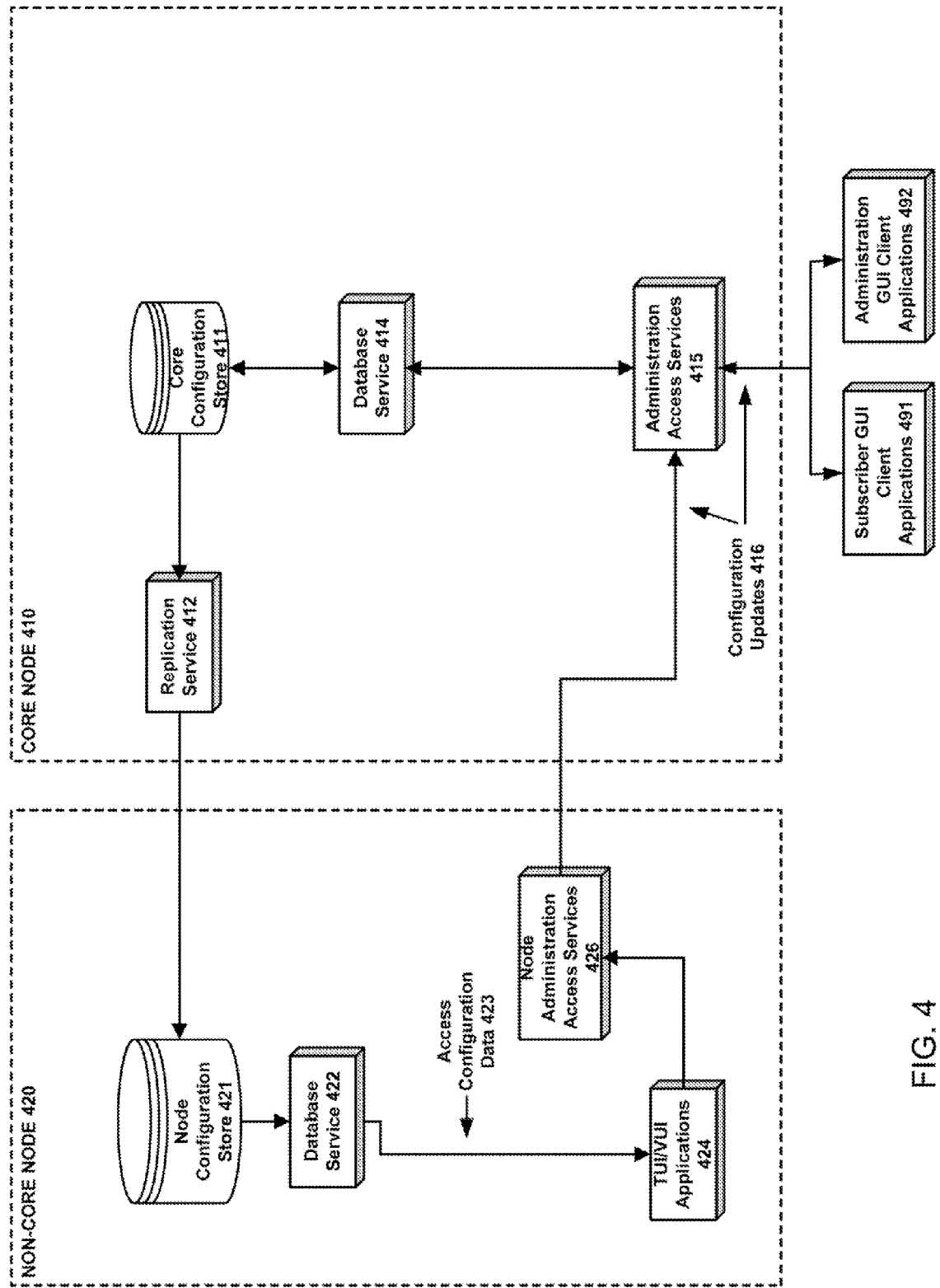
FIG. 4 is a high-level block diagram illustrating selected elements used for configuration data processing in a messaging system configured in accordance with one or more aspects of the present, invention.
Figure 5:
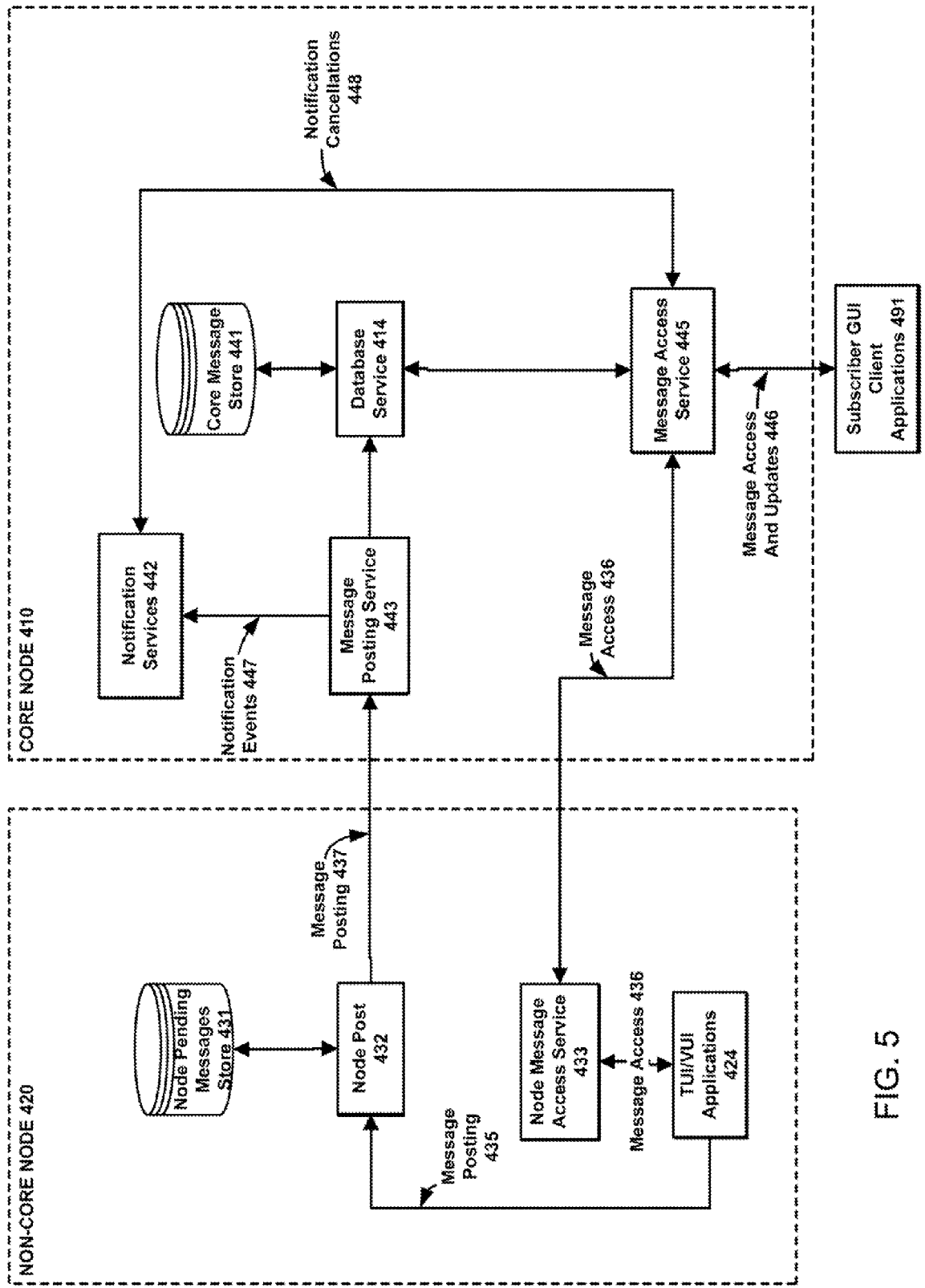
FIG. 5 is a high-level block diagram illustrating selected elements used for local store message processing in a messaging system configured in accordance with one or more aspects of the present invention.
Figure 6:
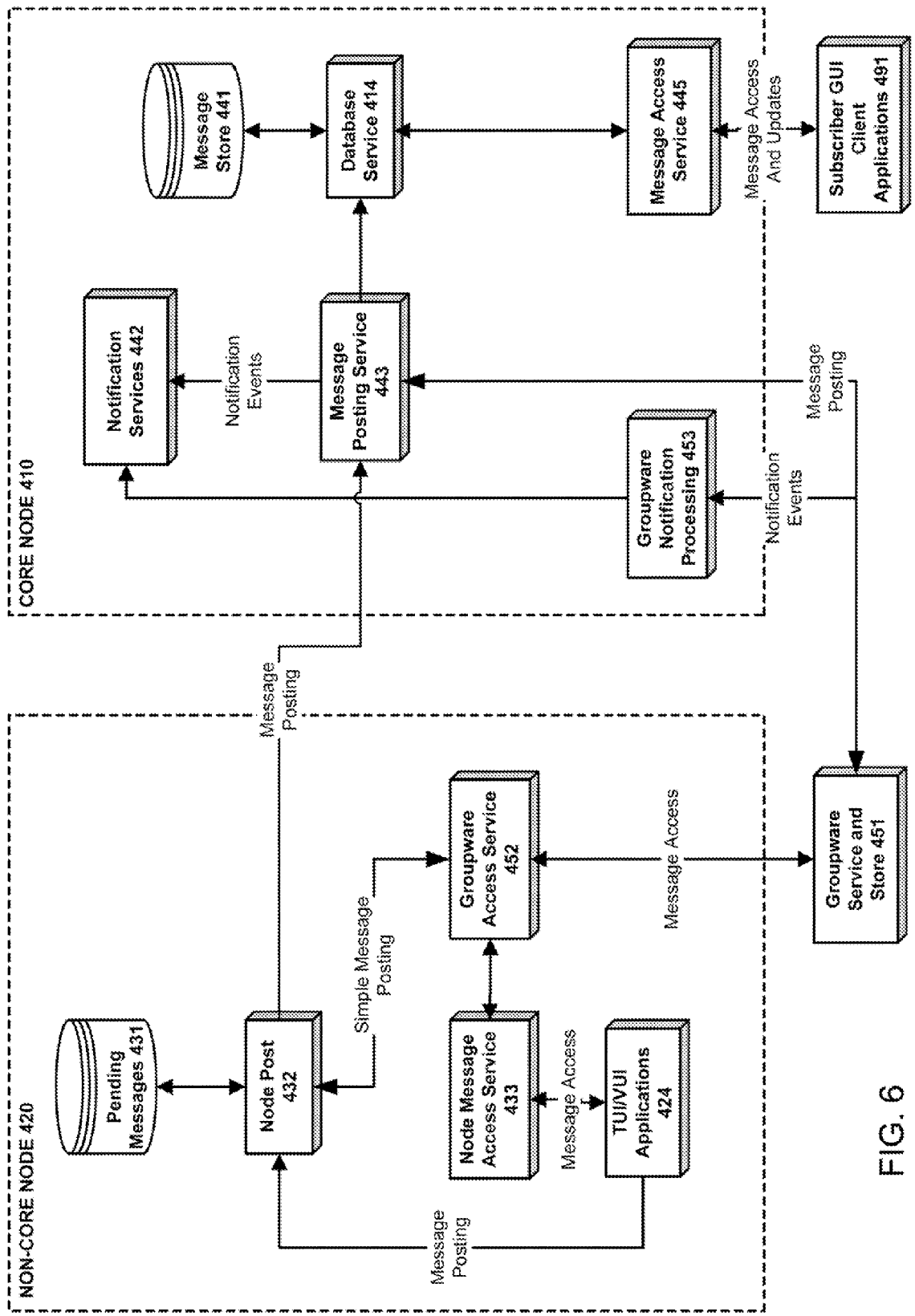
FIG. 6 is a high-level block diagram illustrating selected elements used for groupware store message processing in a messaging system configured in accordance with one or more aspects of the present invention.

FIGS. 4, 5, and 6 illustrate selected aspects of, respectively, configuration data processing, local (here used in the sense of non-groupware) store message processing, and groupware store message processing in an embodiment. As shown in FIG. 4, core configuration data store 411, data replication service 412, core database service 414, and core administration services 415 may reside on a core node 410; the core node 410 may be the same as the core nodes 210 and 310 discussed above. Node configuration data store 421, node database service 422, node administration access services 426, and TUI/VUI applications 424 may reside on a non-core node 420; the non-core node 420 may be the same as the non-core nodes 220 and 320 discussed above.

To edit the configuration data of the unified communication system, a subscriber without administrative privileges may access the core administration access services 415 by using subscriber GUI client applications 491; similarly, a person with administrative privileges may access the core administration access services 415 by using administration GUI client, applications 492. The GUI client applications 491 and 492 may reside remotely and access the core node 410 via a network, for example, a LAN or the Internet. Configuration data may also be edited by a subscriber or administrator logged into the non-core node 420, through the node administration services 422 and TUI/VUI application 424. The administration access services 415 receive the configuration updates from the GUI client applications 491/492 or from the node administration access services 426, and in response update the core configuration store (database) 411 through the core database service 414. The replication service 412 replicates the configuration data from the core configuration store 411 to the non-core node configuration stores such as the store 421. This may be done incrementally, for example, by distributing only the updates; replication may be done in real-time or near real-time, periodically, sporadically, or otherwise. The TUI/VUI applications 424 receive the configuration updates through the non-core node database service 422.

As shown in FIG. 5, the core node 410 further includes a core message store 441 for storing subscribers' messages (which are accessible through the database service 414), a core message access service 445, and a core message posting service 443. The core node 410 further includes notification services 442, which accept and send out notification events 447 and notification event cancellations 448.

The non-core node 420 includes a node pending message store 431 for storing pending messages, i.e., messages not yet posted to the core message store 441. The non-core node 420 also includes a node post service 432 for posting the messages of the node 420 from the node store 431 and to the core message store 441 (through the message posting service 443). The non-core node 420 further includes node message access service 433, which makes the messages stored in the message stores 431 and 441 accessible through the TUI/VUI applications 424 and the subscriber GUI client applications 491.

FIG. 6 illustrates additional components of the nodes 410/420 that are used for accessing groupware services and store 451. The non-core node 420 includes a groupware access service 452 connecting the groupware services and store 451 to the node message access service 433 and to the node post service 432. The core node 410 includes groupware notification processing service 453 for receiving groupware notification information and transmitting the information to the notification services 442. Additionally, the groupware services and store 451 are connected to the message posting service 443.

Figure 7:
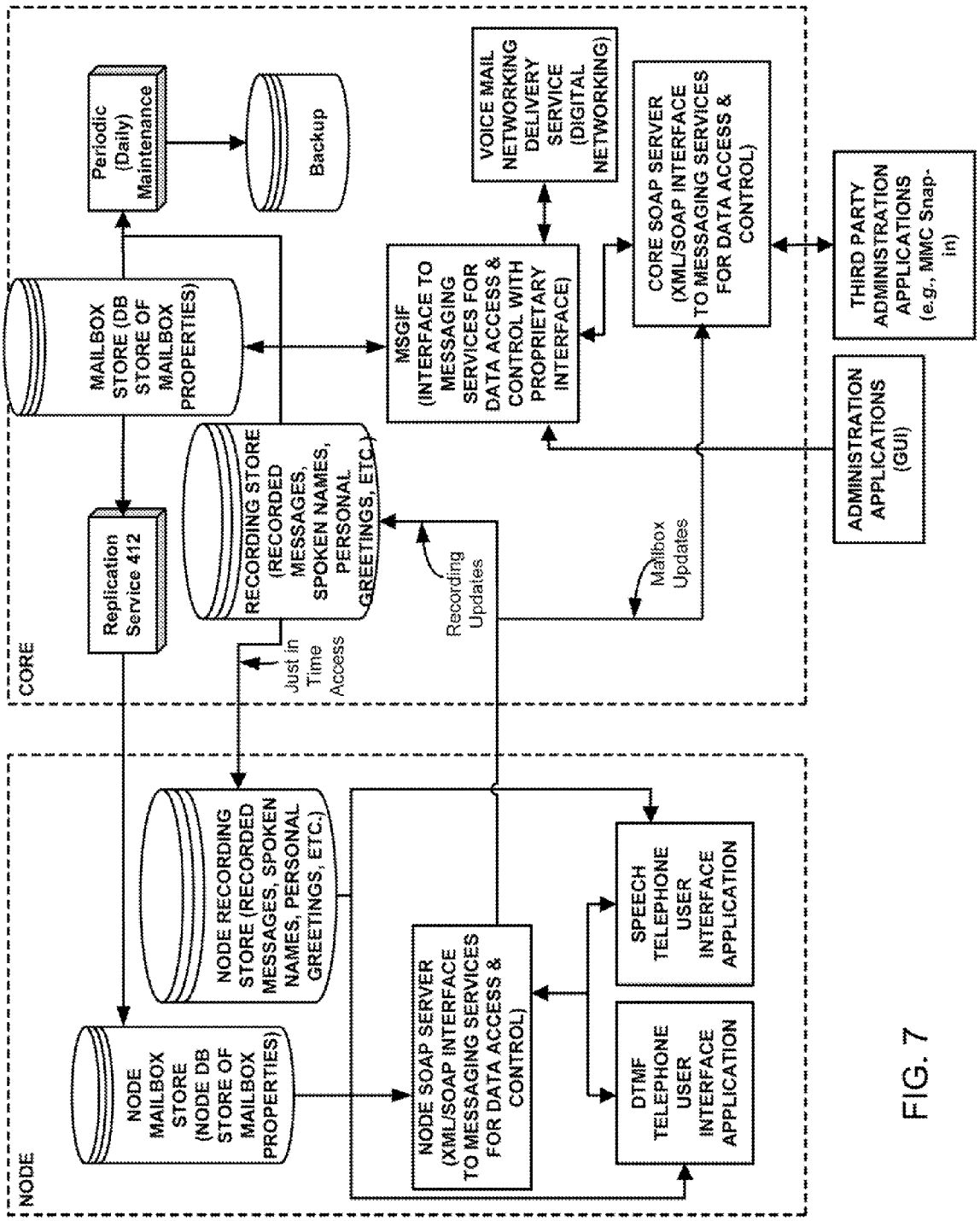
FIG. 7 is a high-level block diagram illustrating selected elements used for mailbox processing in a messaging system configured in accordance with one or more aspects of the present invention.

FIG. 7 illustrates selected aspects of mailbox processing in an embodiment that includes the core node 410 and the non-core node 420, configured to put into operation one, several, or all features of the following Model Consensus;

1. A single authoritative directory store resides on the core node. The directory is authoritative in the sense that the changes to the information stored must be first posted to the authoritative core node directory, before the changes are propagated replicated) to the non-core nodes. Thus, the core node directory is a master storage location from which all other subordinate locations obtain their data, after the data are posted on the core node directory. (Posting may be done from a non-core node to the core node.)

2. The core directory can be maintained through the Microsoft Management Console (making the Microsoft Active Directory a pseudo master), or other external administration programs through the SOAP interface.

3. Mailbox updates are not allowed if the core node 410 is down or otherwise unavailable to the non-core nodes.

4. Read access is accomplished through SQL calls to the local node store. SQL calls are covered by a local object.

5. Mailbox updates are posted directly to the core node 410 through the SOAP server. This configuration provides the ability to trigger back-end processing, such as IMN changes.

(IMN may be a function of message posting, not subscriber updates, although a subscriber update could cancel a pending IMN. Most subscriber back-end processing is generally related to deleting a subscriber, which may cause messages to be deleted, the subscriber is removed from distribution lists and other references may be removed. In some cases some back-end processing occurs when a subscriber is updated as in the IMN case described above.) "IMN" refers to Immediate Message Notification—callouts to telephones, pagers, and similar subscriber personal communication devices, to notify a recipient (subscriber) of receipt and/or availability of a new message.

6. Mailbox information is replicated to non-core nodes (such as the node 420) to support auto attendant, call answering, and personal assistant functions when the core node 410 is down or otherwise unavailable to the non-core nodes.

7. Just-in-time retrieval of names, greetings and announcements from the core by non-core nodes is supported. Non-referenced recordings do not necessarily reach a non-core node. Non-referenced recordings are those recordings that have never been requested by an application running on a specific node. In this specification, just-in-time means when the recording is requested by a user/subscriber for playback. The recordings are delivered to nodes when they are requested, rather than when they are created. In other words, in this embodiment, a recording is delivered to a node in response to being requested by or from the node, instead of being delivered to the node in response to being created. (In some other embodiments, recordings could be delivered to nodes when the recordings are created.)

8. The embodiment is conservatively implemented, maximizing the use of existing services/code. The embodiment also implements hooks to redirect update requests to core node SOAP server from non-core node SOAP server. Some or each of the non-core nodes have own SOAP servers, with the local applications making requests to the local node SOAP server. The local SOAP server decides if the received request can be executed locally, or should be passed on to the core node SOAP server for central execution. For example, looking up a subscriber to verify that a message may be sent may be done locally (here meaning within the same node) with replicated data. Posting of a message may be redirected to the core node, so that core functionality can be invoked. Applications need not have knowledge of this process, so they may ran without change on a single server node+core system, or on a multi-node system.

In certain variants of the embodiment of FIG. 7, the communication system is configured to implement one, several, or all of the following features:

1. Administrator's deletion of a subscriber causes all messages associated with the deleted subscriber to be deleted. Subscriber deletion also causes deletion of distribution list, references, pending notifications, and other operational state data related to the deleted subscriber.

2. Most server applications do not directly access the subscriber database. All server applications do not directly access to the local copy of the database. Thus, the database is accessed Indirectly through the SOAP server that allows (1) redirection of requests to the core if needed (i.e., selectively), and (2) implementing business rules that are consistently applied across the system.

3. Updates by non-core node based clients are written directly to the core node. Local applications cache mailbox properties, rather than reading a possibly out of date version from the local store.

4. Updates are properly sequenced to maintain referential integrity. Master mailbox record (on the core) updates first, deletes last. Referential integrity refers to sequencing changes to a database so as not to cause the database to become corrupted.

Each of the nodes 410/420 may be configured as has been described above in relation to the nodes 210 and 220 of FIG. 2, and the node 100 of FIG. 1.

Figure 8:
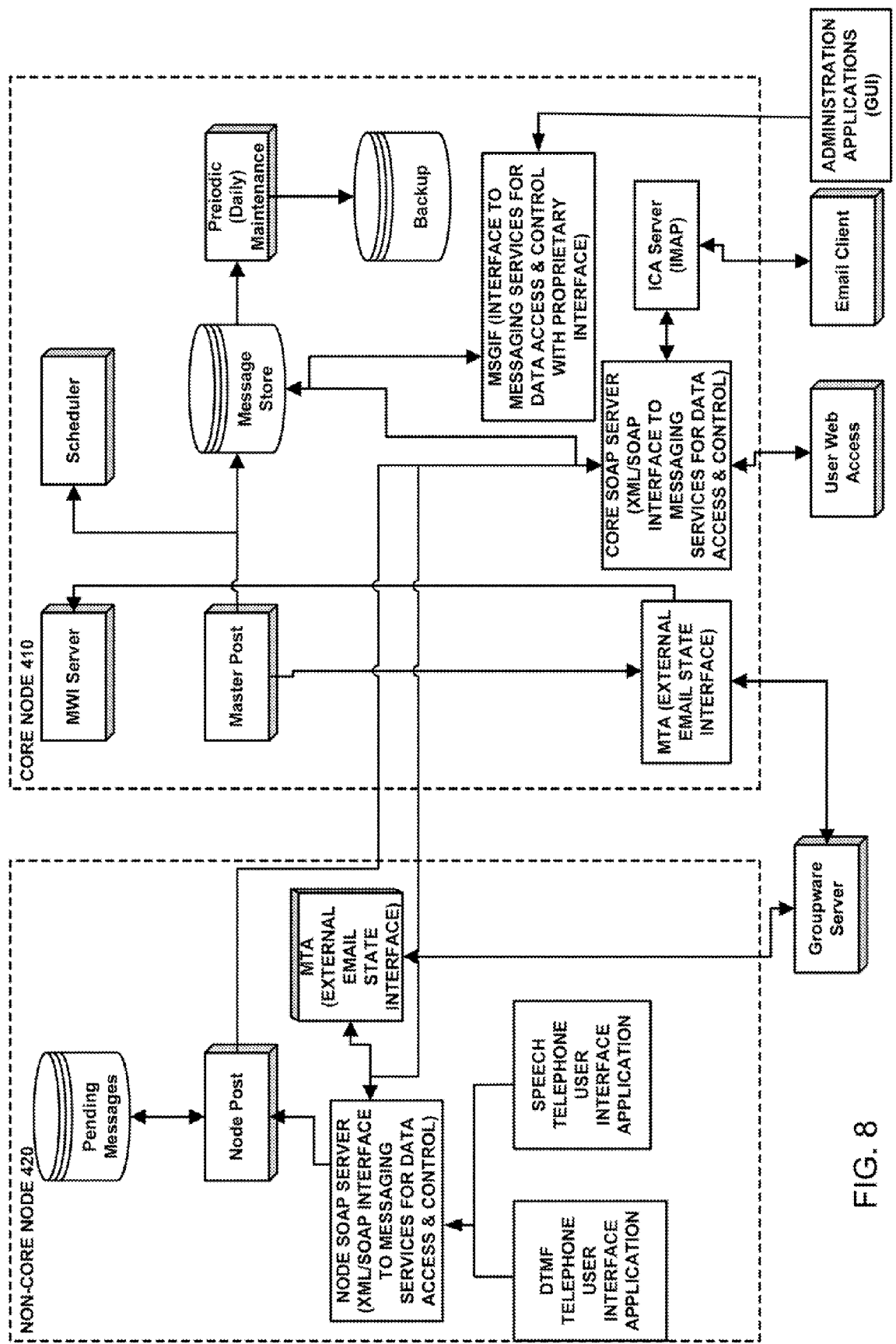
FIG. 8 is a high-level block diagram illustrating selected elements used for message processing in a messaging system configured in accordance with one or more aspects of the present invention.

FIG. 8 illustrates selected aspects of message processing in an embodiment that includes the core node 410 and the non-core node 420, configured to put into operation one, several, or all of the features of the following Model Consensus:

1. A single authoritative message store resides on the core node. The messages are not replicated.

2. When the core node 410 is down, local store messages are not accessible.

3. Local store messages are posted through the core post process so that the messages first appear in the authoritative message store (of the core); and so that centralized services such as voice mail network delivery, MWI, IMN, SMS and other centralized activities triggered by the posting of the message are initiated. Also implemented are distribution list expansion, network delivery, and similar features.

4. Node SBUM access may be through a local MTA, ("SBUM" refers to Server Based Unified Messaging, i.e., unified messaging where the message is stored in the third-party application email store, such as Microsoft Exchange, IBM/Lotus Domino, or Novell Groupwise store; "MTA" refers to message transfer agent.) The MTA may access groupware stores. The MTA may run on both the core node 410 and the non-core node 420. The system may be configured to enable retrieval of messages from the groupware even when the core node 410 is down. SBUM may be configured for posting messages through master post, with possible exceptions of replies and forwards where a local message context is required. Local message context, may be required in cases where, when logged on to an email, store, a reply or forward email must be sent within the same connect, session with the email store, in order for the reply or forward to be properly identified within the email store.

5. Calendar posting and contact updates to groupware servers may be done locally. Here "locally" refers to the non-core node associated with a particular subscriber.

6. When the core node 410 is down or otherwise unavailable, call answering and personal assistant messages may be taken and queued locally (here meaning on the node receiving the particular message) until the core node 410 comes back up.

7. SBUM or local store is implemented on a subscriber-by-subscriber basis.

8. Posting to SBUM store may be done when the core node 410 is down. (For example, this may be done where the recipient is a SBUM: user and notifications are through SBUM.)

The embodiment of FIG. 8 may include all the features described in relation to the FIGS. 4-7. Some of the blocks in FIG. 8 are the same as similarly or identically designated blocks shown in FIGS. 4-7. As regards the MTA blocks, each represents an external email state interface service. The scheduler block represents a scheduling service that maintains a schedule of time-constrained and/or resource-constrained tasks, and initiates the tasks at appropriate times, including, for example, message notification callouts and daily maintenance activity. The ICA Server provides IMAP service, a service that offers an IETF standard IMAP interface through which GUI and other clients can access messages in the non-groupware message store.

In certain variants of the embodiment of FIG. 8, the communication system is configured to implement one, several, or all of the following features:

1. Administrative deletion of a subscriber may cause all messages associated with the deleted subscriber to be deleted.

2. The client message access server may be the SOAP server running in a mode to support node applications. On a single server system, same SOAP server may serve local (of the same node as the server) applications, as well as remote applications (system wide applications, including those on other nodes). Message posting may be handled through this interface as well. The message access server may communicate with both the node post and core message store.

3. Groupware client access server accesses messages on the groupware server. Updates to message properties and message deletion may be done through this interface. Messages may be sent through the post process. Groupware client access may also provide access to contacts and calendar.

4. MTA interlace is used to post messages to a groupware store and to handle store based MWI and immediate message notifications.

5. Node post interface may be identical to the core post interface. In a single node system there may be one post, while on a multi-node system the node post may cache and forward messages to the master post.

6. Non Delivery Notifications or NDNs are handled consistently and completely for cases where posting is unsuccessful.

7. Messages are atomic and normalized. Full SMTP support may be provided.

As has already been noted, not all components may be needed for all configurations. In cases where users are not accessing the system using a browser interface, for example, web servers may be omitted; for cases where local storage only is being used, groupware interfaces may be omitted; and where networking with remote or legacy systems is not used, networking components may be omitted. These are of course merely examples of components that may be omitted.

Concepts described in this document may generally apply to servicing large numbers of users accessing a messaging system simultaneously where there is a central database that requires updating in some cases, but read only access and delayed updating allows for partial availability of the system when the central database is unavailable for some reason.

The process steps of the various methods described throughout this document may be illustrated and explained serially. In specific non-limiting variants/embodiments, the process steps are implemented in the same order in which they are illustrated and/or explained. More generally, certain steps can be performed by separate elements in conjunction or in parallel, asynchronously or synchronously, in a pipelined manner, or otherwise. There is no particular requirement that the steps be performed in the same order in which this description lists them, except where explicitly so indicated, otherwise made clear from the context, or inherently required. Furthermore, not every illustrated step is required in every embodiment in accordance with the invention, while some steps that have not been specifically illustrated may be desirable or necessary in some embodiments in accordance with the invention. Each of the steps may encompass several sub-steps.

As a person skilled in the art would know after reviewing this document, data and signals may be represented using any of a variety of different technologies and techniques, including, without limitation, voltages and currents. The various blocks, modules, processes, and similar elements/blocks/steps shown in the Figures and discussed throughout this document may be implemented in hardware, software, or combinations of hardware and software. The elements may be implemented, and corresponding steps performed by general purpose processors, special purposes processors, other programmable logic device, or a combination of such processors and devices.

This document describes the inventive apparatus, methods, and articles of manufacture for implementing a multi-node messaging system in considerable detail. This was done for illustration purposes only. Neither the specific embodiments of the invention as a whole, nor those of Its features limit the general principles underlying the invention. The specific features described herein may be used in some embodiments and variants, but not in others, without departure from the spirit and scope of the invention as set forth. Various physical arrangements of components and various step sequences also fall within the intended scope of the invention. The invention Is not limited to the use of specific components. Many additional modifications are intended in the foregoing disclosure, and it will be appreciated by those of ordinary skill in the art that in some instances some features of the invention will be employed in the absence of a corresponding use of other features. The illustrative examples therefore do not define the metes and bounds of the invention and the legal protection afforded the invention, which function is carried out by the claims and their equivalents.

What is claimed is:

1. A messaging system comprising:
   a core node configured to provide central repository services for storing system configuration and subscriber information subscribers served by the messaging system, and further to provide centralized administrative and subscriber scriber access to the system configuration and subscriber information; and
   a plurality of non-core nodes each non-core node of the plurality of non-core nodes being in communication with telephone switching equipment associated with said each non-core node, said each non-core node being configured as a platform running telephony user interface applications for processing telephone calls, said each non-core node being further configured to provide a platform for running voice user interface applications far processing the telephone calls;
   wherein:
   the core node and said each non-core node are configured to replicate at least a portion of the system configuration information stored on the core node to said each non-core node;
   the core node and said each non-core node are further configured to replicate at least a portion of the subscriber information stored on the core node to said each non-core node;
   the messaging system is configured to receive calls and voice messages from outside callers to the subscribers served by the messaging system, so that the outside callers can call extensions of specific subscribers selected by the outside callers, and so that the outside callers can leave voicemail for the specific subscribers selected by the outside callers;
   the messaging system is configured to enable the subscribers served by the messaging system to place through the messaging system external calls directed outside the messaging system.

2. The messaging system of claim 1, wherein the telephone switching equipment associated with said each non-core node comprises a private branch exchange, and said each non-core node comprises trunk interfaces coupled to the private branch exchange associated with said each non-core node.

3. The messaging system of claim 2, wherein the telephone switching equipment associated with said each node further comprises an Internet Protocol private branch exchange.

4. The messaging system of claim 2, wherein the at least portion of the system configuration information comprises all system configuration information.

5. The messaging system of claim 2, wherein the at least portion of the subscriber information comprises all subscriber information.

6. The messaging system of claim 2, wherein the plurality of non-core nodes comprises a first non-core node associated with a first plurality of subscribers and a second non-core node associated with a second plurality of subscribers, at least a portion of the subscriber information replicated to the first non-core node comprises information about a second subscriber of the second plurality of subscribers, the first non-core node being coupled to a first private branch exchange for servicing the first plurality of subscribers, the second non-core node being coupled to a second private branch exchange for servicing the second plurality of subscribers, the second plurality of subscribers being different from the first plurality of subscribers.

7. The messaging system of claim 6, wherein the core node is associated with a third plurality of subscribers, the third plurality of subscribers being different from the first plurality of subscribers and from the second plurality of subscribers, the core node being coupled to a third private branch exchange for servicing the third plurality of subscribers, the core node being configured to provide a platform for running the telephony user interface applications for processing telephone calls.

8. The messaging system of claim 2, wherein the plurality of non-core nodes comprises a first non-core node associated with a first plurality of subscribers and a second non-core node associated with a second plurality of subscribers, at least a portion of the subscriber information replicated to the first non-core node comprises information about each subscriber of the second plurality of subscribers, at least a portion of the subscriber information replicated to the second non-core node comprises information about each subscriber of the first plurality of subscribers, the first non-core node being coupled to a first private branch exchange for servicing the first plurality of subscribers, the second non-core node being coupled to a second private branch exchange for servicing the second plurality of subscribers, the second plurality of subscribers being different from the first plurality of subscribers.

9. The messaging system of claim 8, wherein the first private branch exchange comprises a first circuit switched private branch exchange, and the second private branch exchange comprises a second circuit switched private branch exchange.

10. The messaging system of claim 8, wherein the first private branch exchange comprises a first Internet Protocol private branch exchange, and the second private branch exchange comprises a second Internet Protocol private branch exchange.

11. The messaging system of claim 2, wherein the plurality of non-core nodes comprises a first non-core node associated with a first plurality of subscribers and a second non-core node associated with a second plurality of subscribers, the first non-core node being coupled to a first circuit switched private branch exchange for servicing the first plurality of subscribers, the second non-core node being coupled to a second circuit switched private branch exchange for servicing the second plurality of subscribers, the second plurality of subscribers being different from the first plurality of subscribers, at least a portion of the subscriber information replicated to the first non-core node comprises information sufficient to route a call received by the first non-core node through the first circuit switched private branch exchange, the call being directed to any targeted subscriber of the second plurality of subscribers, to the targeted subscriber at the second non-core node through the second circuit switched private branch exchange.

12. The messaging system of claim 2, wherein the core node and the first non-core node are configured to replicate the at least portion of system configuration information and the at least portion of subscriber information in real-time or near real-time.

13. The messaging system of claim 2, wherein the core node and the first non-core node are configured to replicate the at least portion of system configuration information and the at least portion of subscriber information periodically.

14. The messaging system of claim 2, wherein:
the plurality of non-core nodes comprises a first non-core node associated with a first plurality of subscribers and a second non-core node associated with a second plurality of subscribers, the first non-core node being coupled to a first private branch exchange for servicing the first plurality of subscribers, the second non-core node being coupled to a second private branch exchange for servicing the second plurality of subscribers, the second plurality of subscribers being different from the first plurality of subscribers;
wherein the first non-core node is configured to:
receive messages for the first plurality of subscribers through the first private branch exchange, thereby obtaining a first plurality of received messages, and
post the first plurality of received messages on the first non-core node without automatically posting the first plurality of messages on the core node, so that the first plurality of messages is not automatically available from any non-core node of the plurality of non-core nodes other than the first non-core node.

15. The messaging system of claim 14, wherein the first non-core node is further configured to post any message of the first plurality of messages on the core node in response to a request for said any message from the second non-core node.

16. The messaging system of claim 2, further comprising a groupware server coupled to the core node, the groupware server being configured to receive, send, and store email messages and contact information for subscribers of the messaging system.

17. The messaging system of claim 2, wherein the plurality of non-core nodes comprises a first non-core node associated with a first plurality of subscribers and a second non-core node associated with a second plurality of subscribers, the second plurality of subscribers being different from the first plurality of subscribers, said first non-core node is configured to provide one or more first services to the first plurality of subscribers and to outside callers that call the subscribers of the first plurality of subscribers when the core node is not available to the first non-core node, said second non-core node is configured to provide the one or more first services to the second plurality of subscribers and to outside callers that call the subscribers of the second plurality of subscribers when the core node is not available to the second non-core node, each first service of the one or more first services not requiring updating of the system configuration information, said each first service of the one or more first services not requiring updating of the subscriber information.

18. The messaging system of claim 2, wherein the plurality of non-core nodes comprises a first non-core node associated with a first plurality of subscribers and a second non-core node associated with a second plurality of subscribers, said first non-core node is configured to provide a plurality of services to the first plurality of subscribers and to outside callers that call the subscribers of the first plurality of subscribers when the core node is not available to the first non-core node, said second non-core node is configured to provide the plurality of services to the second plurality of subscribers and to outside callers that call the subscribers of the second plurality of subscribers when the core node is not available to the second non-core node, the plurality of services consisting of all services provided by the first and second nodes not requiring updating of (1) the system configuration information and (2) the subscriber information.

19. The messaging system of claim 2, wherein the plurality of non-core nodes comprises a first non-core node configured to provide one or more first services to subscribers of the system and to outside callers that call the subscribers when the core node is not available to the first non-core node, each first service of the one or more first services not requiring updating of the system configuration information, said each first service of the one or more first services not requiring updating of the subscriber information.

20. The messaging system of claim 2, wherein the plurality of non-core nodes comprises a first non-core node configured to provide one or more first services to subscribers of the system and to outside callers that call the subscribers when the core node is not available to the first non-core node, each first service of the one or more first services not requiring updating of the system configuration information, said each first service of the one or more first services not requiring updating of the subscriber information, the plurality of services consisting of all services provided by the system that do not require updating of (1) the system configuration information and (2) the subscriber information.

21. The messaging system of claim 2, wherein each node of the plurality of non-core nodes is configured to provide one or more first services to subscribers of the system and to outside callers that call the subscribers when the core node is not available to said each non-core node, each first service of the one or more first services not requiring updating of the system configuration information, said each first service of the one or more first services not requiring updating of the subscriber information.

22. The messaging system of claim 2, wherein the plurality of non-core nodes comprises a non-core node associated with a plurality of subscribers, the first non-core node being coupled to a circuit switched private branch exchange for servicing the plurality of subscribers, at least a portion of the subscriber information replicated to the non-core node comprises information sufficient to route a call received by the non-core node through the circuit switched private branch exchange, the call being directed to a targeted subscriber of the plurality of subscribers, to the targeted subscriber.

23. The messaging system of claim 2, wherein at least a portion of the subscriber information replicated comprises information sufficient to route a call received by any non-core node of the plurality of non-core nodes to any subscriber of the messaging system.

24. The messaging system of claim 2, wherein:
the core node comprises core Simple Object Access Protocol (SOAP) server;
the plurality of non-core nodes comprises a first non-core node, the first non-core node comprising a first node SOAP server; and the first non-core node is configured so that when application running on the first non-core node make requests for SOAP services, the requests are received by the first node SOAP server, the first node SOAP server determines which of the requests require central execution and which of the requests do not require central execution, the first node SOAP server passes the requests that require central execution to the core SOAP server, and the first node SOAP server executes the requests that do not require central execution.

25. A method of operating a multi-node messaging system comprising a core node and a plurality of non-core nodes, each non-core node of the plurality of non-core nodes being in communication with telephone switching equipment associated with said each non-core node, the method comprising:
storing system configuration information of the messaging: system on the core node;
storing subscriber information for subscribers served by the multi-node messaging system on the core node;
replicating at least a portion of the subscriber information stored on the core node to said each non-core node;
replicating at least a portion of the system configuration information stored on the core node to said each non-core node;
providing through the core node centralized administrative and subscriber access to the system configuration information and the subscriber information; and
running, at said each non-core node, one or more telephony user interface applications for processing telephone calls, the one or more telephony user interface applications comprising at least one voice user interface application, wherein the telephony user interface applications enable the multi-node messaging system to receive calls and voice messages from outside callers to the subscribers served by the multi-node messaging system, so that the outside callers can call extensions of specific subscribers selected by the outside callers, and so that the outside callers can leave voicemail for the specific subscribers called by the outside callers, and wherein the one or more telephony user interface applications configure the multi-node messaging system to enable the subscribers served by the multi-node messaging system to place through the multi-node messaging system external calls directed outside the multi-node messaging system.

26. The method of claim 25, wherein the telephone switching equipment associated with said each non-core node comprises a private branch exchange, and said each non-core node comprises trunk interfaces coupled to the private branch exchange associated with said each non-core node.

27. The method of claim 26, wherein the telephone switching equipment associated with said each non-core node further comprises an Internet Protocol private branch exchange.

28. The method of claim 26, wherein the step of replicating at least a portion of the system configuration information comprises replicating all system configuration information of the messaging system.

29. The method of claim 26, wherein the step of replicating at least a portion of the subscriber information comprises replicating all subscriber information of the messaging system.

30. The method of claim 26, wherein the plurality of non-core nodes comprises a first non-core node associated with a first plurality of subscribers and a second non-core node associated with a second plurality of subscribers, the step of replicating at least a portion of the subscriber information is performed so that the at least portion of the subscriber information replicated to the first non-core node comprises information about a second subscriber of the second plurality of subscribers, the first non-core node being coupled to a first private branch exchange for servicing the first plurality of subscribers, the second non-core node being coupled to a second private branch exchange for servicing the second plurality of subscribers, the second plurality of subscribers being different from the first plurality of subscribers.

31. The method of claim 26, wherein the plurality of non-core nodes comprises a first non-core node associated with a first plurality of subscribers and a second non-core node associated with a second plurality of subscribers, the step of replicating at least a portion of the subscriber information is performed so that the at least portion of the subscriber information replicated to the first non-core node comprises information about each subscriber of the second plurality of subscribers, the at least portion of the subscriber information replicated to the second non-core node comprises information about each subscriber of the first plurality of subscribers, the first non-core node being coupled to a first private branch exchange for servicing the first plurality of subscribers, the second non-core node being coupled to a second private branch exchange for servicing the second plurality of subscribers, the second plurality of subscribers being different from the first plurality of subscribers.

32. The method of claim 26, wherein the plurality of non-core nodes comprises a first non-core node associated with a first plurality of subscribers and a second non-core node associated with a second plurality of subscribers, the first non-core node being coupled to a first circuit switched private branch exchange for servicing the first plurality of subscribers, the second non-core node being coupled to a second circuit switched private branch exchange for servicing; the second plurality of subscribers, the second plurality of subscribers being different from the first plurality of subscribers, wherein:
the step of replicating at least a portion of the subscriber information comprises replicating to the first non-core node information sufficient to route a call received by the first non-core node through the first circuit switched private branch exchange, the call being directed to any targeted subscriber of the second plurality of subscribers, to the targeted subscriber at the second non-core node through the second circuit switched private branch exchange.

33. The method of claim 26, wherein the step of replicating at least a portion of the system configuration information and the step of replicating at least a portion of the subscriber information are performed in real-time or near real-time.

34. The method of claim 26, wherein the step of replicating at least a portion of the system configuration information and the step of replicating at least a portion of the subscriber information are performed periodically.

35. The method of claim 26, wherein:
the plurality of non-core nodes comprises a first non-core node associated with a first plurality of subscribers and a second non-core node associated with a second plurality of subscribers, the first non-core node being coupled to a first private branch exchange for servicing the first plurality of subscribers, the second non-core node being coupled to a second private branch exchange for servicing the second plurality of subscribers, the second plurality of subscribers being different from the first plurality of subscribers, the method further comprising:

receiving messages for the first plurality of subscribers at the first non-core node through the first private branch exchange, thereby obtaining a first plurality of received messages; and posting the first plurality of received messages on the first non-core node without automatically posting the first plurality of messages on the core node, so that the first plurality of messages is not automatically available from any non-core node of the plurality of non-core nodes other than the first non-core node.

36. The method of claim 35, further comprising:

posting any message of the first plurality of messages on the core node in response to a request for said any message from the second non-core node.

37. The method of claim 26, further comprising:

operating a groupware server coupled to the core node, the groupware server being configured to receive, send, and store email messages and contact information for subscribers of the messaging system.

38. The method of claim 26, wherein the plurality of non-core nodes comprises a first non-core node associated with a first plurality of subscribers and a second non-core node associated with a second plurality of subscribers, the second plurality of subscribers being different from the first plurality of subscribers, the method further comprising:

providing at the first non-core node one or more first services to the first plurality of subscribers and to outside callers that call the subscribers of the first plurality of subscribers when the core node is not available to the first non-core node; and providing at the second non-core node the one or more first services to the second plurality of subscribers and to outside callers that call the subscribers of the second plurality of subscribers when the core node is not available to the second non-core node;

wherein each first service of the one or more first services does not require updating of the system configuration information, and said each first service of the one or more first services does not require updating of the subscriber information.

39. The method of claim 26, wherein the plurality of non-core nodes comprises a first non-core node associated with a first plurality of subscribers and a second non-core node associated with a second plurality of subscribers, the method further comprising:

providing at the first non-core node a plurality of services to the first plurality of subscribers and to outside callers that call the subscribers of the first plurality of subscribers when the core node is not available to the first non-core node; and providing at the second non-core node the plurality of services to the second plurality of subscribers and to outside callers that call the subscribers of the second plurality of subscribers when the core node is not available to the second non-core node;

wherein the plurality of services consists of all services provided by the first and second nodes that do not require updating of (1) the system configuration information and (2) the subscriber information.

40. The method of claim 26, wherein the plurality of non-core nodes comprises a first non-core node associated with a first plurality of subscribers and a second non-core node associated with a second plurality of subscribers, the first non-core node being coupled to a first private branch exchange for servicing the first plurality of subscribers, the second non-core node being coupled to a second private branch exchange for servicing the second plurality of subscribers, the second plurality of subscribers being different from the first plurality of subscribers, and wherein the step of replicating at least a portion of the subscriber information comprises replicating to the first non-core node information sufficient to route a first call received by the first non-core node through the first private branch exchange, the first call being directed to any targeted subscriber of the first plurality of subscribers, to said any targeted subscriber of the first plurality of subscribers, and wherein the step of replicating at least a portion of the subscriber information comprises replicating to the first non-core node information sufficient to route a second call received by the first non-core node through the first private branch exchange, the second call being directed to any targeted subscriber of the second plurality of subscribers, to said any targeted subscriber of the second plurality of subscribers through the second private branch exchange.

41. The method of claim 26, wherein the steps of replicating comprise replicating information sufficient to route a call received by any non-core node of the plurality of non-core nodes to any subscriber of the multi-node messaging system.

42. The method of claim 26, wherein the steps of replicating comprise replicating to each non-core node of the plurality of non-core nodes information sufficient to route a call received by any non-core node of the plurality of non-core nodes to any subscriber of the multi-node messaging system.

43. The method of claim 26, wherein the plurality of non-core nodes comprises a first non-core node, the method further comprising:

providing at the first non-core node one or more first services to subscribers of the multi-node messaging system and to outside callers that call the subscribers when the core node is not available to the first non-core node wherein each first service of the one or more first services does not require updating of the system configuration information, and said each first service of the one or more first services does not require updating of the subscriber information.

44. The method of claim 26, wherein the plurality of non-core nodes comprises a first non-core node, the method further comprising:

providing at the first non-core node one or more first services to all subscribers of the multi-node messaging system and to outside callers that call the subscribers when the core node is not available to the first non-core node, wherein each first service of the one or more first services does not require updating of the system configuration information, and said each first service of the one or more first services does not require updating of the subscriber information.

45. The method of claim 26, wherein the plurality of non-core nodes comprises a first non-core node, the method further comprising:

providing at the first non-core node one or more first services to subscribers of the multi-node messaging system and to outside callers that call the subscribers when the core node is not available to the first non-core node, wherein each first service of the one or more first services does not require updating of the system configuration information, said each first service of the one or more first services does not require updating of the subscriber information, and said one or more first services consist of all services provided by the multi-node messaging system that do not require updating of (1) the system configuration information and (2) the subscriber information.

46. An article of manufacture comprising machine-readable storage medium with program code stored in the medium, the program code, when executed by at least one processor of a multi-node messaging system comprising a core node and a plurality of non-core nodes, each non-core node of the plurality of non-core nodes being in communication with telephone switching equipment associated with said each non-core node, configures the system to perform steps comprising:

storing system configuration information of the multi-node messaging system on the core node;

storing, subscriber information for subscribers served by the multi-node messaging system on the core node;

replicating at least a portion of the subscriber information stored on the core node to said each non-core node;

replicating at least a portion of the system configuration information stored on the core node to said each non-core node;

providing through the core node centralized administrative and subscriber access to the system configuration information and the subscriber information; and running, at said each non-core node, one or more telephony user interface applications for processing telephone calls, the one or more telephony user interface applications comprising at least one voice user interface application, wherein the telephony user interface applications enable the multi-node messaging system to receive calls and voice messages from outside callers to the subscribers served by the multi-node messaging system, so that the outside callers can call extensions of specific subscribers selected by the outside callers, and so that the outside callers can leave voicemail for the specific subscribers selected by the outside callers, and wherein the one or more telephony user interface applications configure the multi-node messaging system to enable the subscribers served by the multi-node messaging system to place through the multi-node messaging system external calls directed outside the multi-node messaging system.

47. A messaging system for servicing a plurality of subscribers, the messaging system comprising:

a core node configured to provide central repository services for storing system configuration information and subscriber information for the plurality of subscribers:

a plurality of non-core nodes;

telephone switching equipment in communication with each non-core node of the plurality of non-core nodes, said each non-core node being configured to provide a platform for running telephony user interface applications and voice user interface applications for processing telephone calls of the plurality of subscribers;

wherein the messaging system is configured to (1) receive calls and voice messages from outside callers to the subscribers of the plurality of subscribers, so that the outside callers can call extensions of specific subscribers of the plurality of subscribers selected by the outside callers, and so that the outside callers can leave voicemail for the specific subscribers called by the outside callers, to (2) enable the plurality of subscribers served by the messaging system to place through the messaging system external calls directed outside the messaging system, and to (3) provide through the core node centralized administrative and subscriber access to the system configuration information and the subscriber information; and wherein the core node and said each non-core node are configured to replicate at least a portion of the system configuration information and at least a portion of the subscriber information stored on the core node to said each non-core node so that the messaging system can provide at least partial services to the subscribers and to outside callers when the core node is unavailable.

48. The messaging system of claim 47, wherein the plurality of non-core nodes comprises a first non-core node and the telephone switching equipment comprises trunk interfaces for a first number of telephone lines, the first number of telephone lines exceeding number of telephone lines that can be serviced by the first non-core node.

49. The messaging system of claim 47, wherein the telephone switching equipment comprises trunk interfaces for number of telephone lines exceeding number of telephone lines that can be serviced by any non-core node of the plurality of non-core nodes.

50. The messaging system of claim 47, wherein the telephone switching equipment is a private branch exchange.

51. A messaging system comprising:

a core node comprising a core store configured to perform central repository services for system configuration information and subscriber information, to provide centralized administrative and subscriber access to the system configuration information and the subscriber information, and to store received and sent messages of subscribers of the messaging system, the core store being an authoritative store of the messaging system, the messages comprising telephone messages and email messages; and a plurality of non-core nodes, each non-core node of the plurality of non-core nodes being configured as a platform running telephony and email user interface applications for processing the received and sent telephone and email messages, the telephony and email user interface applications comprising at least one voice user interface application, said each non-core node comprising a store configured to store at least some of the received and sent telephone and email messages;

wherein the messaging system is configured to (1) receive calls and voice messages from outside callers to the subscribers served by the messaging system, so that the outside callers can call extensions of specific subscribers selected by the outside callers, and so that the outside callers can leave voicemail for the specific subscribers called by the outside callers, and to (2) enable the plurality of subscribers served by the messaging system to place through the messaging system external calls directed outside the messaging system; and the core node and said each non-core node are configured to replicate at least a portion of the system configuration information and at least a portion of the subscriber information stored on the core node to said each non-core node.

52. The messaging system of claim 51, wherein the core node and the plurality of non-core nodes are configured so that a message received by a given non-core node of the plurality of non-core nodes when the core node is unavailable, is stored in the store of said given non-core node until the core node becomes available and the message is posted to the core store when the core node becomes available.

53. The messaging system of claim 52, wherein the messages further include facsimile messages, instant messages (IMs), and short message service (SMS) messages, wherein said each non-core node is further configured to provide a platform for running, facsimile, IM, and SMS user interlace applications for processing the messages.

54. The messaging system of claim 53, wherein the at least portion of the system configuration information and the at least portion of the subscriber information replicated to said each non-core node comprise information sufficient to route messages received by said each non-core node and intended by senders of the messages for any target subscriber of the subscribers of the system to the target subscriber when the core node is unavailable.

55. The messaging system of claim 54, wherein the plurality of non-core nodes comprises a first non-core node associated with a first plurality of subscribers of the system, the first plurality of subscribers comprising fewer than all of the subscribers of the system, the at least portion of the system configuration information and the at least portion of the subscriber information replicated to the first non-core node comprise information sufficient to route messages received by the first non-core node and intended for any target subscriber of the subscribers of the system to the target subscriber when the core node is unavailable, regardless of whether the target subscriber is included in the first plurality of subscribers.

\* \* \* \* \*

UNITED STATES PATENT AND TRADEMARK OFFICE
CERTIFICATE OF CORRECTION

PATENT NO. : 9,001,691 B2
APPLICATION NO. : 11/747154
DATED : April 7, 2015
INVENTOR(S) : Douglas G. Murray, Steven J. Tindall and Roger E. Visser It is certified that error appears in the above-identified patent and that said Letters Patent is hereby corrected as shown below:

In the claims

Column 19, line 32, cancel "information subscribers" and replace the cancelled text with --information for subscribers--;

Column 19, line 34, cancel "subsciber scriber access" and replace the cancelled text with --subscriber access--;

Column 19, line 36, cancel "nodes each" and replace the cancelled text with --nodes, each--;

Column 19, line 44, cancel "far processing" and replace the cancelled text with --for processing--;

Column 22, line 63, cancel "comprises core" and replace the cancelled text with --comprises a core--;

Column 23, lines 1-2, cancel "application running" and replace the cancelled text with --applications running--;

Column 23, lines 16-17, cancel "messaging: system" and replace the cancelled text with --messaging system--;

Column 24, line 33, cancel "servicing; the" and replace the cancelled text with --servicing the--;

Column 26, line 33, cancel "non-core node" and replace the cancelled text with --non-core node,--;

Column 27, line 12, cancel "storing, subscriber" and replace the cancelled text with --storing subscriber--;

Column 27, line 44, cancel "subscribers:" and replace the cancelled text with --subscribers;--;

Signed and Sealed this
Fifteenth Day of March, 2016

Michelle K. Lee
*Director of the United States Patent and Trademark Office*

CERTIFICATE OF CORRECTION (continued)
U.S. Pat. No. 9,001,691 B2

Column 28, line 7, cancel "non-core node and" and replace the cancelled text with --non-core node, and--;

Column 28, line 66, cancel "running, facsimile" and replace the text with --running facsimile--;

Column 28, line 66, cancel "user interlace" and replace the cancelled text with --user interface--.